US009870778B2

(12) United States Patent
Peters et al.

(10) Patent No.: US 9,870,778 B2
(45) **Date of Patent: *Jan. 16, 2018**

(54) OBTAINING SPARSENESS INFORMATION FOR HIGHER ORDER AMBISONIC AUDIO RENDERERS

(71) Applicant: QUALCOMM Incorporated, San Diego, CA (US)

(72) Inventors: Nils Günther Peters, San Diego, CA (US); Dipanjan Sen, San Diego, CA (US); Martin James Morrell, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/451,087

(22) Filed: Mar. 6, 2017

(65) Prior Publication Data

US 2017/0200452 A1 Jul. 13, 2017

Related U.S. Application Data

(63) Continuation of application No. 14/724,560, filed on May 28, 2015, now Pat. No. 9,609,452, and a
(Continued)

(51) Int. Cl.
*H04R 5/00* (2006.01)
*G10L 19/008* (2013.01)
(Continued)

(52) U.S. Cl.
CPC .......... *G10L 19/008* (2013.01); *G10L 19/167* (2013.01); *H04S 3/008* (2013.01);
(Continued)

(58) Field of Classification Search
CPC ........ H04S 2420/11; H04S 7/301; H04S 7/30; H04S 2400/09; H04S 1/00;
(Continued)

(56) References Cited

U.S. PATENT DOCUMENTS 6,931,370 B1 8/2005 McDowell
8,406,436 B2 3/2013 Craven et al.
(Continued)

FOREIGN PATENT DOCUMENTS

CN 101548554 A 9/2009
CN 102440002 A 5/2012
(Continued)

OTHER PUBLICATIONS

E. Cuthill, "Reducing the bandwidth of sparse symmetric matrices", 1969, pp. 157-172.*
(Continued)

*Primary Examiner* — Norman Yu
(74) *Attorney, Agent, or Firm* — Shumaker & Sieffert, P.A.

(57) ABSTRACT

In general, techniques are described for obtaining audio rendering information in a bitstream. A device configured to render higher order ambisonic coefficients comprising a processor and a memory may perform the techniques. The processor may be configured to obtain sparseness information indicative of a sparseness of a matrix used to render the higher order ambisonic coefficients to a plurality of speaker feeds. The memory may be configured to store the sparseness information.

20 Claims, 12 Drawing Sheets

Related U.S. Application Data continuation-in-part of application No. 14/174,769, filed on Feb. 6, 2014.

(60) Provisional application No. 62/023,662, filed on Jul. 11, 2014, provisional application No. 62/005,829, filed on May 30, 2014, provisional application No. 61/762,758, filed on Feb. 8, 2013.

(51) Int. Cl.

| | |
|---|---|
| ***G10L 19/16*** | (2013.01) |
| ***H04S 3/00*** | (2006.01) |
| ***H04S 3/02*** | (2006.01) |
| *G06F 17/00* | (2006.01) |
| *G10L 19/00* | (2013.01) |
| *H04S 7/00* | (2006.01) |

(52) U.S. Cl.

CPC ................ *H04S 3/02* (2013.01); *H04S 7/301* (2013.01); *H04S 7/30* (2013.01); *H04S 2420/03* (2013.01); *H04S 2420/11* (2013.01)

(58) Field of Classification Search

CPC .... H04S 2400/15; H04S 2420/03; H04S 5/00; H04S 3/02; H04S 3/008; G10L 19/008; G10L 19/167; H04R 2205/024; H04R 1/20

USPC ............. 381/17, 303, 63, 94.2; 700/94, 500

See application file for complete search history.

(56) References Cited

U.S. PATENT DOCUMENTS

| | | | | |
|---|---|---|---|---|
| 9,338,574 | B2 | 5/2016 | Jax et al. | |
| 9,609,452 | B2 | 3/2017 | Peters et al. | |
| 2011/0249821 | A1 | 10/2011 | Jaillet et al. | |
| 2012/0093344 | A1 | 4/2012 | Sun et al. | |
| 2012/0155653 | A1 | 6/2012 | Jax et al. | |
| 2012/0259442 | A1* | 10/2012 | Jin ............................ | H04S 7/30 700/94 |
| 2012/0314875 | A1 | 12/2012 | Lee et al. | |
| 2013/0064375 | A1 | 3/2013 | Atkins et al. | |
| 2014/0025386 | A1 | 1/2014 | Xiang et al. | |
| 2014/0133660 | A1 | 5/2014 | Jax et al. | |
| 2014/0226823 | A1 | 8/2014 | Sen et al. | |
| 2015/0213803 | A1 | 7/2015 | Peters et al. | |
| 2015/0264484 | A1 | 9/2015 | Peters et al. | |
| 2015/0341736 | A1 | 11/2015 | Peters et al. | |

FOREIGN PATENT DOCUMENTS

| | | | |
|---|---|---|---|
| EP | 2450880 | A1 | 5/2012 |
| EP | 2451196 | A1 | 5/2012 |
| EP | 2946468 | A2 | 11/2015 |
| WO | 2013006338 | A2 | 1/2013 |
| WO | 2014012945 | A1 | 1/2014 |
| WO | 2014111308 | A2 | 7/2014 |
| WO | 2014194099 | A1 | 12/2014 |

OTHER PUBLICATIONS

"Call for Proposals for 3D Audio," International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, 20 pp.

Ballard, et al., "Symmetric Eigenvalue Problem: Tridiagonal Reduction", Parallel Algorithms, May 18, 2009, 12 pp., Retrieved from the Internet: URL: http://www.eecs.berkeley.edu/~ballard/projects/CS267paper.pdf [retrieved on Aug. 11, 2015].

Boehm, "Decoding for 3D," AES Convention 130; May 13, 2011, 16 pp.

Boehm, et al., "HOA Decoder—changes and proposed modification," Technicolor, MPEG Meeting; Mar. 31-Apr. 4, 2014; Valencia; (Motion Picture Expert Group or ISO/IEC JTC1/SC29N/WG11), No. m33196, Mar. 26, 2014,16 pp.

Combined PDAM Registration and PDAM Consideration Ballot on ISO/IEC 23001-8:2013/PDAM 1 [SC 29/WG 11 N 114450], ISO/IEC JTC 1/SC 29/WG11, Document N14129, Apr. 21, 2014, 20 pp.

Cuthill, et al., "Reducing the Bandwidth of Sparse Symmetric Matrices", Proceedings of the 1969 24th national conference, Jan. 1, 1969, XP055207178, pp. 157-172.

Herre, et al., "MPEG-H 3D Audio—The New Standard for Coding of Immersive Spatial Audio," IEEE Journal of Selected Topics in Signal Processing, vol. 9, No. 5, Aug. 2015, pp. 770-779.

Hollerweger, "An Introduction to Higher Order Ambisonic," Oct. 2008, 13 pp.

"Information technology—High efficiency coding and media delivery in heterogeneous environments—Part 3: 3D Audio," ISO/IEC JTC 1/SC 29N, Apr. 4, 2014, 337 pp.

"Information technology—High efficiency coding and media delivery in heterogeneous environments—Part 3: 3D Audio," ISO/IEC JTC 1/SC 29N, Jul. 25, 2005, 311 pp.

"Information technology—High efficiency coding and media delivery in heterogeneous environments—Part 3: Part 3: 3D Audio, Amendment 3: MPEG-H 3D Audio Phase 2," ISO/IEC JTC 1/SC 29N, Jul. 25, 2015, 208 pp.

International Preliminary Report on Patentability from International Application No. PCT/US2015/033262, dated Sep. 9, 2016, 7 pp.

International Search Report and Written Opinion from International Application No. PCT/US2015/033262, dated Nov. 17, 2015, 19 pp.

Painter, "Perceptual Coding of Digital Audio," Proceedings of the IEEE, vol. 8 (4), Apr. 2000, pp. 451-513.

Partial International Search Report from International Application No. PCT/US2015/033262 dated Aug. 19, 2015, 7 pp.

Poletti, "Three-Dimensional Surround Sound Systems Based on Spherical Harmonics," J. Audio Eng. Soc., vol. 53, No. 11, Nov. 2005, pp. 1004-1025.

Poletti, "Unified Description of Ambisonics Using Real and Complex Spherical Harmonics," Ambisonics Symposium Jun. 25-27, 2009, 10 pp.

Schonefeld, "Spherical Harmonics," Jul. 1, 2005, Accessed online [Jul. 9, 2013] at URL:http://videoarch1.s-inf.de/~volker/prosem_paper.pdf., 25 pp.

Second Written Opinion from International Application No. PCT/US2015/033262, dated May 18, 2016, 7 pp.

Sen, et al., "Differences and Similarities in Formats for Scene Based Audio," ISO/IEC JTC1/SC29/WG11 MPEG2012/M26704, Oct. 2012, Shanghai, China, 7 pp.

Sen, et al., "RM1-HOA Working Draft Text", MPEG Meeting; Jan. 13-17, 2014; San Jose; (Motion Picture Expert Group or ISO/IEC JTC1/SC29/WG11), No. m31827, Jan. 11, 2014, 83 pp.

Response to Written Opinion dated Nov. 17, 2015 from International Application No. PCT/US2015/033262 dated Mar. 30, 2016, 6 pp.

Response to Second Written Opinion dated May 18, 2016, from International Application No. PCT/US2015/033262, dated Jun. 15, 2016, 16 pp.

* cited by examiner

OBTAINING SPARSENESS INFORMATION FOR HIGHER ORDER AMBISONIC AUDIO RENDERERS

This application is a continuation of U.S. application Ser. No. 14/724,560 filed May 28, 2015, entitled "OBTAINING SPARSENESS INFORMATION FOR HIGHER ORDER AMBISONIC AUDIO RENDERERS," which claims the benefit of U.S. Provisional Application No. 62/023,662, filed Jul. 11, 2014, entitled "SIGNALING AUDIO RENDERING INFORMATION IN A BITSTREAM," and U.S. Provisional Application No. 62/005,829, filed May 30, 2014, entitled "SIGNALING AUDIO RENDERING INFORMATION IN A BITSTREAM," and is a continuation-in-part of U.S. application Ser. No. 14/174,769, filed Feb. 6, 2014, entitled "SIGNALING AUDIO RENDERING INFORMATION IN A BITSTREAM," where U.S. application Ser. No. 14/174,769 claims the benefit of U.S. Provisional Application No. 61/762,758, filed Feb. 8, 2013, entitled "SIGNALING AUDIO RENDERING INFORMATION IN A BITSTREAM," the entire contents of each of the foregoing U.S. Provisional Applications and U.S. Application hereby incorporated by reference as if set forth herein in their respective entireties.

TECHNICAL FIELD

This disclosure relates to rendering information and, more specifically, rendering information for higher-order ambisonic (HOA) audio data.

BACKGROUND

During production of audio content, the sound engineer may render the audio content using a specific renderer in an attempt to tailor the audio content for target configurations of speakers used to reproduce the audio content. In other words, the sound engineer may render the audio content and playback the rendered audio content using speakers arranged in the targeted configuration. The sound engineer may then remix various aspects of the audio content, render the remixed audio content and again playback the rendered, remixed audio content using the speakers arranged in the targeted configuration. The sound engineer may iterate in this manner until a certain artistic intent is provided by the audio content. In this way, the sound engineer may produce audio content that provides a certain artistic intent or that otherwise provides a certain sound field during playback (e.g., to accompany video content played along with the audio content).

SUMMARY

In general, techniques are described for specifying audio rendering information in a bitstream representative of audio data. In other words, the techniques may provide for a way by which to signal audio rendering information used during audio content production to a playback device, which may then use the audio rendering information to render the audio content. Providing the rendering information in this manner enables the playback device to render the audio content in a manner intended by the sound engineer, and thereby potentially ensure appropriate playback of the audio content such that the artistic intent is potentially understood by a listener. In other words, the rendering information used during rendering by the sound engineer is provided in accordance with the techniques described in this disclosure so that the audio playback device may utilize the rendering information to render the audio content in a manner intended by the sound engineer, thereby ensuring a more consistent experience during both production and playback of the audio content in comparison to systems that do not provide this audio rendering information.

In one aspect, a device configured to render higher order ambisonic coefficients comprises one or more processors configured to obtain sparseness information indicative of a sparseness of a matrix used to render the higher order ambisonic coefficients to a plurality of speaker feeds, and a memory configured to store the sparseness information.

In another aspect, a method of rendering higher order ambisonic coefficients comprises obtaining sparseness information indicative of a sparseness of a matrix used to render the higher order ambisonic coefficients to generate a plurality of speaker feeds.

In another aspect, a device configured to produce a bitstream comprises a memory configured to store a matrix, and one or more processors configured to obtain sparseness information indicative of a sparseness of the matrix used to render higher order ambisonic coefficients to generate a plurality of speaker feeds.

In another aspect, a method of producing a bitstream comprises obtaining sparseness information indicative of a sparseness of a matrix used to render higher order ambisonic coefficients to generate a plurality of speaker feeds.

In another aspect, a device configured to render higher order ambisonic coefficients comprises one or more processors configured to obtain sign symmetry information indicative of sign symmetry of a matrix used to render the higher order ambisonic coefficients to generate a plurality of speaker feeds, and a memory configured to store the sparseness information.

In another aspect, a method of rendering higher order ambisonic coefficients comprises obtaining sign symmetry information indicative of sign symmetry of a matrix used to render the higher order ambisonic coefficients to generate a plurality of speaker feeds.

In another aspect, a device configured to produce a bitstream comprises a memory configured to store a matrix used to render higher order ambisonic coefficient to generate a plurality of speaker feeds, and one or more processors configured to sign symmetry information indicative of sign symmetry of the matrix.

In another aspect, a method of producing a bitstream comprises obtaining sparseness information indicative of a sparseness of a matrix used to render higher order ambisonic coefficients to generate a plurality of speaker feeds.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
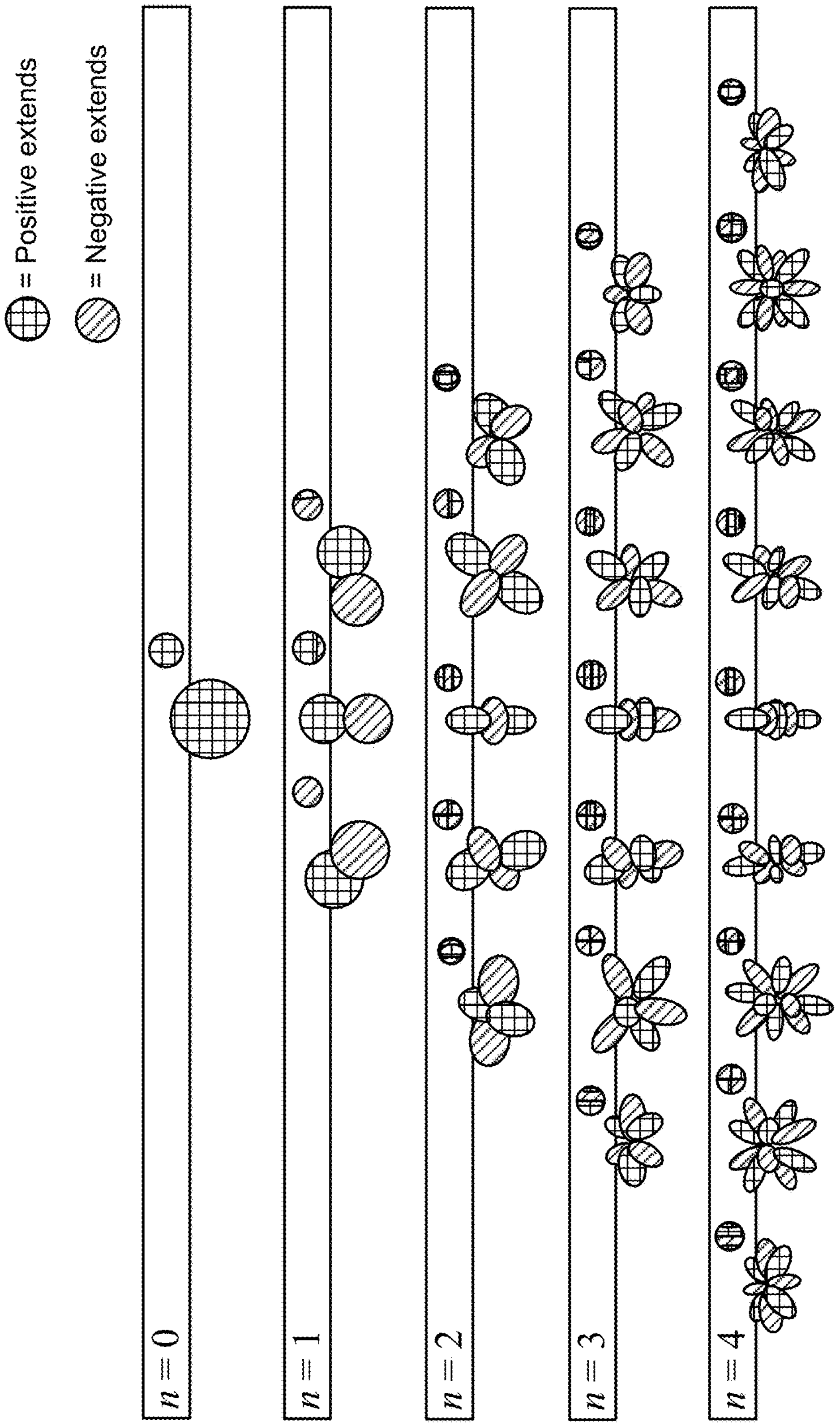
FIG. 1 is a diagram illustrating spherical harmonic basis functions of various orders and sub-orders.

The evolution of surround sound has made available many output formats for entertainment nowadays. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, various formats that includes height speakers such as the 7.1.4 format and the 22.2 format (e.g., for use with the Ultra High Definition Television standard). Non-consumer formats can span any number of speakers (in symmetric and non-symmetric geometries) often termed 'surround arrays'. One example of such an array includes 32 loudspeakers positioned on coordinates on the corners of a truncated icosahedron.

The input to a future MPEG encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); and (iii) scene-based audio, which involves representing the soundfield using coefficients of spherical harmonic basis functions (also called "spherical harmonic coefficients" or SHC, "Higher-order Ambisonics" or HOA, and "HOA coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a soundfield. The hierarchical set of elements may refer to a set of elements in which the elements are ordered such that a basic set of lower-ordered elements provides a full representation of the modeled soundfield. As the set is extended to include higher-order elements, the representation becomes more detailed, increasing resolution.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty}\left[4\pi\sum_{n=0}^{\infty} j_n(kr_r)\sum_{m=-n}^{n} A_n^m(k)Y_n^m(\theta_r, \varphi_r)\right]e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $k=\omega/c$, c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s,\theta_s,\varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC, $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r,\theta_r,\varphi_r\}$. The remaining figures are described below in the context of object-based and SHC-based audio coding.

Figure 2:
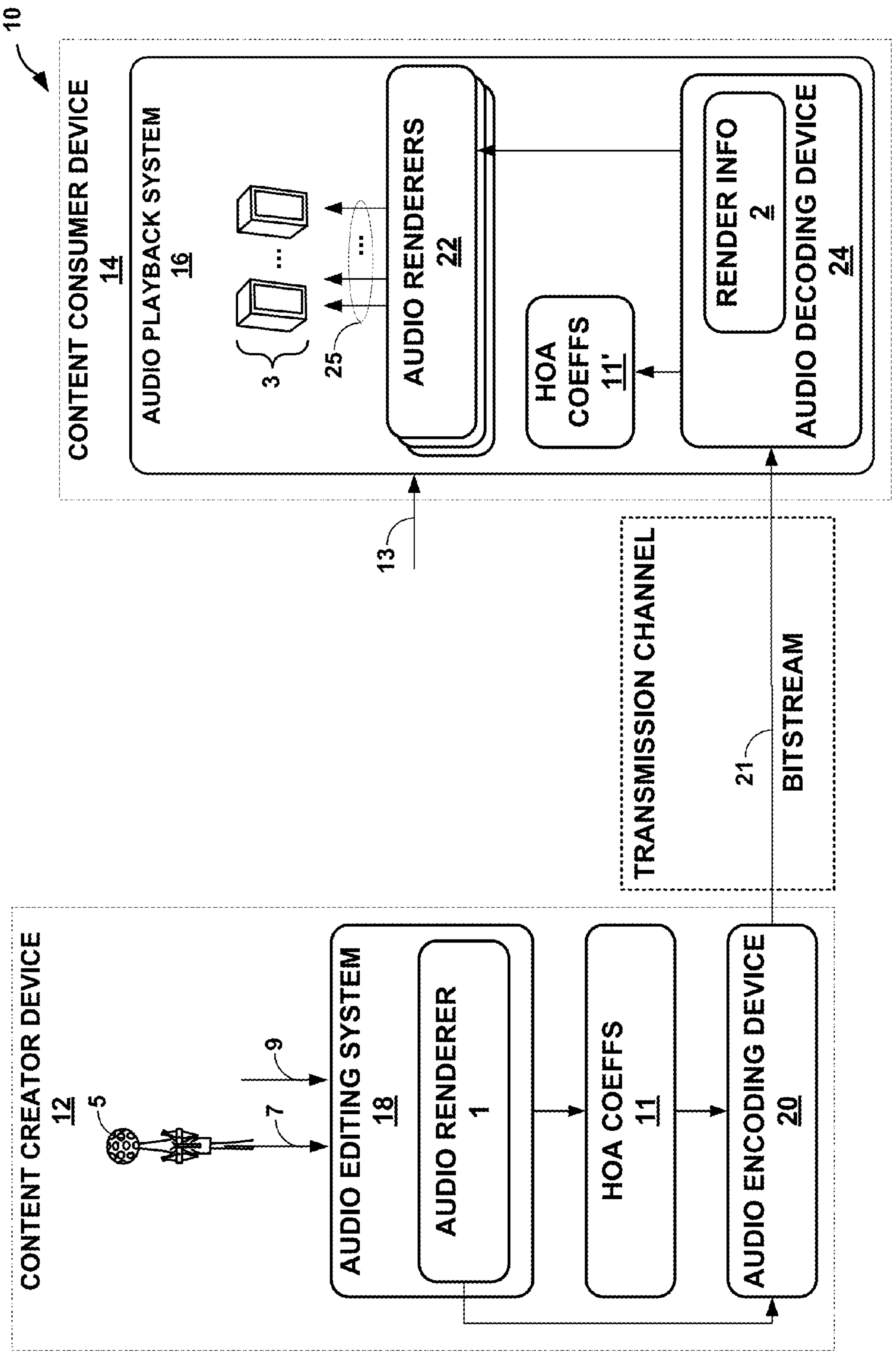
FIG. 2 is a diagram illustrating a system that may perform various aspects of the techniques described in this disclosure.

FIG. 2 is a diagram illustrating a system 10 that may perform various aspects of the techniques described in this disclosure. As shown in the example of FIG. 2, the system 10 includes a content creator device 12 and a content consumer device 14. While described in the context of the content creator device 12 and the content consumer device 14, the techniques may be implemented in any context in which SHCs (which may also be referred to as HOA coefficients) or any other hierarchical representation of a soundfield are encoded to form a bitstream representative of the audio data. Moreover, the content creator device 12 may represent any form of computing device capable of implementing the techniques described in this disclosure, including a handset (or cellular phone), a tablet computer, a smart phone, or a desktop computer to provide a few examples. Likewise, the content consumer device 14 may represent any form of computing device capable of implementing the techniques described in this disclosure, including a handset (or cellular phone), a tablet computer, a smart phone, a set-top box, or a desktop computer to provide a few examples.

The content creator device 12 may be operated by a movie studio or other entity that may generate multi-channel audio content for consumption by operators of content consumer devices, such as the content consumer device 14. In some examples, the content creator device 12 may be operated by an individual user who would like to compress HOA coefficients 11. Often, the content creator generates audio content in conjunction with video content. The content consumer device 14 may be operated by an individual. The content consumer device 14 may include an audio playback system 16, which may refer to any form of audio playback system capable of rendering SHC for play back as multi-channel audio content.

The content creator device 12 includes an audio editing system 18. The content creator device 12 obtain live recordings 7 in various formats (including directly as HOA coefficients) and audio objects 9, which the content creator device 12 may edit using audio editing system 18. A microphone 5 may capture the live recordings 7. The content creator may, during the editing process, render HOA coefficients 11 from audio objects 9, listening to the rendered speaker feeds in an attempt to identify various aspects of the soundfield that require further editing. The content creator device 12 may then edit HOA coefficients 11 (potentially indirectly through manipulation of different ones of the audio objects 9 from which the source HOA coefficients may be derived in the manner described above). The content creator device 12 may employ the audio editing system 18 to generate the HOA coefficients 11. The audio editing system 18 represents any system capable of editing audio data and outputting the audio data as one or more source spherical harmonic coefficients.

When the editing process is complete, the content creator device 12 may generate a bitstream 21 based on the HOA coefficients 11. That is, the content creator device 12 includes an audio encoding device 20 that represents a device configured to encode or otherwise compress HOA coefficients 11 in accordance with various aspects of the techniques described in this disclosure to generate the bitstream 21. The audio encoding device 20 may generate the bitstream 21 for transmission, as one example, across a transmission channel, which may be a wired or wireless channel, a data storage device, or the like. The bitstream 21 may represent an encoded version of the HOA coefficients 11 and may include a primary bitstream and another side bitstream, which may be referred to as side channel information.

While shown in FIG. 2 as being directly transmitted to the content consumer device 14, the content creator device 12 may output the bitstream 21 to an intermediate device positioned between the content creator device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the content creator device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2.

As further shown in the example of FIG. 2, the content consumer device 14 includes the audio playback system 16. The audio playback system 16 may represent any audio playback system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode HOA coefficients 11' from the bitstream 21, where the HOA coefficients 11' may be similar to the HOA coefficients 11 but differ due to lossy operations (e.g., quantization) and/or transmission via the transmission channel. The audio playback system 16 may, after decoding the bitstream 21 to obtain the HOA coefficients 11' and render the HOA coefficients 11' to output loudspeaker feeds 25. The loudspeaker feeds 25 may drive one or more loudspeakers (which are not shown in the example of FIG. 2 for ease of illustration purposes).

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances or in conjunction with the dynamic determination of the loudspeaker information 13, the audio playback system 16 may prompt a user to interface with the audio playback system 16 and input the loudspeaker information 13.

The audio playback system 16 may then select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22. One or more speakers 3 may then playback the rendered loudspeaker feeds 25.

In some instances, the audio playback system 16 may select any one the of audio renderers 22 and may be configured to select the one or more of audio renderers 22 depending on the source from which the bitstream 21 is received (such as a DVD player, a Blu-ray player, a smartphone, a tablet computer, a gaming system, and a television to provide a few examples). While any one of the audio renderers 22 may be selected, often the audio renderer used when creating the content provides for a better (and possibly the best) form of rendering due to the fact that the content was created by the content creator 12 using this one of audio renderers, i.e., the audio renderer 5 in the example of FIG. 3. Selecting the one of the audio renderers 22 that is the same or at least close (in terms of rendering form) may provide for a better representation of the sound field and may result in a better surround sound experience for the content consumer 14.

In accordance with the techniques described in this disclosure, the audio encoding device 20 may generate the bitstream 21 to include the audio rendering information 2 ("render info 2"). The audio rendering information 2 may include a signal value identifying an audio renderer used when generating the multi-channel audio content, i.e., the audio renderer 1 in the example of FIG. 3. In some instances, the signal value includes a matrix used to render spherical harmonic coefficients to a plurality of speaker feeds.

In some instances, the signal value includes two or more bits that define an index that indicates that the bitstream includes a matrix used to render spherical harmonic coefficients to a plurality of speaker feeds. In some instances, when an index is used, the signal value further includes two or more bits that define a number of rows of the matrix included in the bitstream and two or more bits that define a number of columns of the matrix included in the bitstream. Using this information and given that each coefficient of the two-dimensional matrix is typically defined by a 32-bit floating point number, the size in terms of bits of the matrix may be computed as a function of the number of rows, the number of columns, and the size of the floating point numbers defining each coefficient of the matrix, i.e., 32-bits in this example.

In some instances, the signal value specifies a rendering algorithm used to render spherical harmonic coefficients to a plurality of speaker feeds. The rendering algorithm may include a matrix that is known to both the audio encoding device 20 and the decoding device 24. That is, the rendering algorithm may include application of a matrix in addition to other rendering steps, such as panning (e.g., VBAP, DBAP or simple panning) or NFC filtering. In some instances, the signal value includes two or more bits that define an index associated with one of a plurality of matrices used to render spherical harmonic coefficients to a plurality of speaker feeds. Again, both the audio encoding device 20 and the decoding device 24 may be configured with information indicating the plurality of matrices and the order of the plurality of matrices such that the index may uniquely identify a particular one of the plurality of matrices. Alternatively, the audio encoding device 20 may specify data in the bitstream 21 defining the plurality of matrices and/or the order of the plurality of matrices such that the index may uniquely identify a particular one of the plurality of matrices.

In some instances, the signal value includes two or more bits that define an index associated with one of a plurality of rendering algorithms used to render spherical harmonic coefficients to a plurality of speaker feeds. Again, both the audio encoding device 20 and the decoding device 24 may be configured with information indicating the plurality of rendering algorithms and the order of the plurality of rendering algorithms such that the index may uniquely identify a particular one of the plurality of matrices. Alternatively, the audio encoding device 20 may specify data in the bitstream 21 defining the plurality of matrices and/or the order of the plurality of matrices such that the index may uniquely identify a particular one of the plurality of matrices.

In some instances, the audio encoding device 20 specifies audio rendering information 2 on a per audio frame basis in the bitstream. In other instances, audio encoding device 20 specifies the audio rendering information 2 a single time in the bitstream.

The decoding device 24 may then determine audio rendering information 2 specified in the bitstream. Based on the signal value included in the audio rendering information 2, the audio playback system 16 may render a plurality of speaker feeds 25 based on the audio rendering information 2. As noted above, the signal value may in some instances include a matrix used to render spherical harmonic coefficients to a plurality of speaker feeds. In this case, the audio playback system 16 may configure one of the audio renderers 22 with the matrix, using this one of the audio renderers 22 to render the speaker feeds 25 based on the matrix.

In some instances, the signal value includes two or more bits that define an index that indicates that the bitstream includes a matrix used to render the HOA coefficients 11' to the speaker feeds 25. The decoding device 24 may parse the matrix from the bitstream in response to the index, whereupon the audio playback system 16 may configure one of the audio renderers 22 with the parsed matrix and invoke this one of the renderers 22 to render the speaker feeds 25. When the signal value includes two or more bits that define a number of rows of the matrix included in the bitstream and two or more bits that define a number of columns of the matrix included in the bitstream, the decoding device 24 may parse the matrix from the bitstream in response to the index and based on the two or more bits that define a number of rows and the two or more bits that define the number of columns in the manner described above.

In some instances, the signal value specifies a rendering algorithm used to render the HOA coefficients 11' to the speaker feeds 25. In these instances, some or all of the audio renderers 22 may perform these rendering algorithms. The audio playback device 16 may then utilize the specified rendering algorithm, e.g., one of the audio renderers 22, to render the speaker feeds 25 from the HOA coefficients 11'.

When the signal value includes two or more bits that define an index associated with one of a plurality of matrices used to render the HOA coefficients 11' to the speaker feeds 25, some or all of the audio renderers 22 may represent this plurality of matrices. Thus, the audio playback system 16 may render the speaker feeds 25 from the HOA coefficients 11' using the one of the audio renderers 22 associated with the index.

When the signal value includes two or more bits that define an index associated with one of a plurality of rendering algorithms used to render the HOA coefficients 11' to the speaker feeds 25, some or all of the audio renderers 34 may represent these rendering algorithms. Thus, the audio playback system 16 may render the speaker feeds 25 from the spherical harmonic coefficients 11' using one of the audio renderers 22 associated with the index.

Depending on the frequency with which this audio rendering information is specified in the bitstream, the decoding device 24 may determine the audio rendering information 2 on a per-audio-frame-basis or a single time.

By specifying the audio rendering information 3 in this manner, the techniques may potentially result in better reproduction of the multi-channel audio content and according to the manner in which the content creator 12 intended the multi-channel audio content to be reproduced. As a result, the techniques may provide for a more immersive surround sound or multi-channel audio experience.

In other words and as noted above, Higher-Order Ambisonics (HOA) may represent a way by which to describe directional information of a sound-field based on a spatial Fourier transform. Typically, the higher the Ambisonics order N, the higher the spatial resolution, the larger the number of spherical harmonics (SH) coefficients (N+1)^2, and the larger the required bandwidth for transmitting and storing the data.

A potential advantage of this description is the possibility to reproduce this soundfield on most any loudspeaker setup (e.g., 5.1, 7.1 22.2, etc.). The conversion from the soundfield description into M loudspeaker signals may be done via a static rendering matrix with $(N+1)^2$ inputs and M outputs. Consequently, every loudspeaker setup may require a dedicated rendering matrix. Several algorithms may exist for computing the rendering matrix for a desired loudspeaker setup, which may be optimized for certain objective or subjective measures, such as the Gerzon criteria. For irregular loudspeaker setups, algorithms may become complex due to iterative numerical optimization procedures, such as convex optimization. To compute a rendering matrix for irregular loudspeaker layouts without waiting time, it may be beneficial to have sufficient computation resources available. Irregular loudspeaker setups may be common in domestic living room environments due to architectural constrains and aesthetic preferences. Therefore, for the best soundfield reproduction, a rendering matrix optimized for such scenario may be preferred in that it may enable reproduction of the soundfield more accurately.

Because an audio decoder usually does not require much computational resources, the device may not be able to compute an irregular rendering matrix in a consumer-friendly time. Various aspects of the techniques described in this disclosure may provide for the use a cloud-based computing approach as follows:

1. The audio decoder may send via an Internet connection the loudspeaker coordinates (and, in some instances, also SPL measurements obtained with a calibration microphone) to a server;
2. The cloud-based server may compute the rendering matrix (and possibly a few different versions, so that the customer may later choose from these different versions); and
3. The server may then send the rendering matrix (or the different versions) back to the audio decoder via the Internet connection.

This approach may allow the manufacturer to keep manufacturing costs of an audio decoder low (because a powerful processor may not be needed to compute these irregular rendering matrices), while also facilitating a more optimal audio reproduction in comparison to rendering matrices usually designed for regular speaker configurations or geometries. The algorithm for computing the rendering matrix may also be optimized after an audio decoder has shipped, potentially reducing the costs for hardware revisions or even recalls. The techniques may also, in some instances, gather a lot of information about different loudspeaker setups of consumer products which may be beneficial for future product developments.

Figure 3:
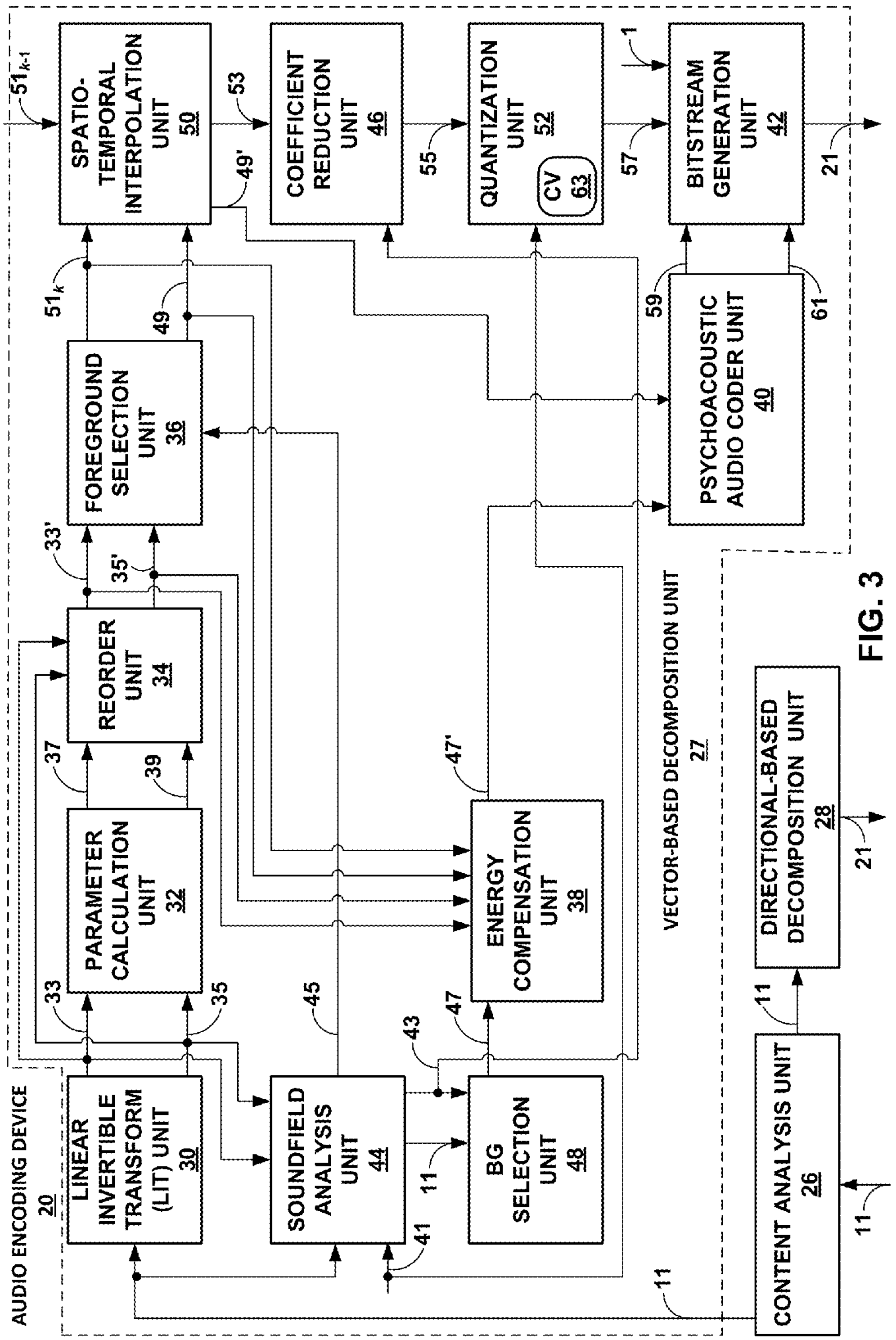
FIG. 3 is a block diagram illustrating, in more detail, one example of the audio encoding device shown in the example of FIG. 2 that may perform various aspects of the techniques described in this disclosure.

In some instances, the system shown in FIG. 3 may not signal the audio rendering information 2 in the bitstream 21 as described above, but instead signal this audio rendering information 2 as metadata separate from the bitstream 21. Alternatively or in conjunction with that described above, the system shown in FIG. 3 may signal a portion of the audio rendering information 2 in the bitstream 21 as described above and signal a portion of this audio rendering information 3 as metadata separate from the bitstream 21. In some examples, the audio encoding device 20 may output this metadata, which may then be uploaded to a server or other device. The audio decoding device 24 may then download or otherwise retrieve this metadata, which is then used to augment the audio rendering information extracted from the bitstream 21 by the audio decoding device 24. The bitstream 21 formed in accordance with the rendering information aspects of the techniques are described below with respect to the examples of FIGS. 8A-8D.

FIG. 3 is a block diagram illustrating, in more detail, one example of the audio encoding device 20 shown in the example of FIG. 2 that may perform various aspects of the techniques described in this disclosure. The audio encoding device 20 includes a content analysis unit 26, a vector-based decomposition unit 27 and a directional-based decomposition unit 28. Although described briefly below, more information regarding the audio encoding device 20 and the various aspects of compressing or otherwise encoding HOA coefficients is available in International Patent Application Publication No. WO 2014/194099, entitled "INTERPOLA- TION FOR DECOMPOSED REPRESENTATIONS OF A SOUND FIELD," filed 29 May 2014.

The content analysis unit 26 represents a unit configured to analyze the content of the HOA coefficients 11 to identify whether the HOA coefficients 11 represent content generated from a live recording or an audio object. The content analysis unit 26 may determine whether the HOA coefficients 11 were generated from a recording of an actual soundfield or from an artificial audio object. In some instances, when the framed HOA coefficients 11 were generated from a recording, the content analysis unit 26 passes the HOA coefficients 11 to the vector-based decomposition unit 27. In some instances, when the framed HOA coefficients 11 were generated from a synthetic audio object, the content analysis unit 26 passes the HOA coefficients 11 to the directional-based synthesis unit 28. The directional-based synthesis unit 28 may represent a unit configured to perform a directional-based synthesis of the HOA coefficients 11 to generate a directional-based bitstream 21.

As shown in the example of FIG. 3, the vector-based decomposition unit 27 may include a linear invertible transform (LIT) unit 30, a parameter calculation unit 32, a reorder unit 34, a foreground selection unit 36, an energy compensation unit 38, a psychoacoustic audio coder unit 40, a bitstream generation unit 42, a soundfield analysis unit 44, a coefficient reduction unit 46, a background (BG) selection unit 48, a spatio-temporal interpolation unit 50, and a quantization unit 52.

The linear invertible transform (LIT) unit 30 receives the HOA coefficients 11 in the form of HOA channels, each channel representative of a block or frame of a coefficient associated with a given order, sub-order of the spherical basis functions (which may be denoted as HOA[k], where k may denote the current frame or block of samples). The matrix of HOA coefficients 11 may have dimensions D: $M\times(N+1)^2$.

The LIT unit 30 may represent a unit configured to perform a form of analysis referred to as singular value decomposition. While described with respect to SVD, the techniques described in this disclosure may be performed with respect to any similar transformation or decomposition that provides for sets of linearly uncorrelated, energy compacted output. Also, reference to "sets" in this disclosure is generally intended to refer to non-zero sets unless specifically stated to the contrary and is not intended to refer to the classical mathematical definition of sets that includes the so-called "empty set." An alternative transformation may comprise a principal component analysis, which is often referred to as "PCA." Depending on the context, PCA may be referred to by a number of different names, such as discrete Karhunen-Loeve transform, the Hotelling transform, proper orthogonal decomposition (POD), and eigenvalue decomposition (EVD) to name a few examples. Properties of such operations that are conducive to the underlying goal of compressing audio data are 'energy compaction' and 'decorrelation' of the multichannel audio data.

In any event, assuming the LIT unit 30 performs a singular value decomposition (which, again, may be referred to as "SVD") for purposes of example, the LIT unit 30 may transform the HOA coefficients 11 into two or more sets of transformed HOA coefficients. The "sets" of transformed HOA coefficients may include vectors of transformed HOA coefficients. In the example of FIG. 3, the LIT unit 30 may perform the SVD with respect to the HOA coefficients 11 to generate a so-called V matrix, an S matrix, and a U matrix. SVD, in linear algebra, may represent a factorization of a y-by-z real or complex matrix X (where X may represent multi-channel audio data, such as the HOA coefficients 11) in the following form:

$$X=USV^*$$

U may represent a y-by-y real or complex unitary matrix, where the y columns of U are known as the left-singular vectors of the multi-channel audio data. S may represent a y-by-z rectangular diagonal matrix with non-negative real numbers on the diagonal, where the diagonal values of S are known as the singular values of the multi-channel audio data. V* (which may denote a conjugate transpose of V) may represent a z-by-z real or complex unitary matrix, where the z columns of V* are known as the right-singular vectors of the multi-channel audio data.

In some examples, the V* matrix in the SVD mathematical expression referenced above is denoted as the conjugate transpose of the V matrix to reflect that SVD may be applied to matrices comprising complex numbers. When applied to matrices comprising only real-numbers, the complex conjugate of the V matrix (or, in other words, the V* matrix) may be considered to be the transpose of the V matrix. Below it is assumed, for ease of illustration purposes, that the HOA coefficients 11 comprise real-numbers with the result that the V matrix is output through SVD rather than the V* matrix. Moreover, while denoted as the V matrix in this disclosure, reference to the V matrix should be understood to refer to the transpose of the V matrix where appropriate. While assumed to be the V matrix, the techniques may be applied in a similar fashion to HOA coefficients 11 having complex coefficients, where the output of the SVD is the V* matrix. Accordingly, the techniques should not be limited in this respect to only provide for application of SVD to generate a V matrix, but may include application of SVD to HOA coefficients 11 having complex components to generate a V* matrix.

In this way, the LIT unit 30 may perform SVD with respect to the HOA coefficients 11 to output US[k] vectors 33 (which may represent a combined version of the S vectors and the U vectors) having dimensions D: $M\times(N+1)^2$, and V[k] vectors 35 having dimensions D: $(N+1)^2\times(N+1)^2$. Individual vector elements in the US[k] matrix may also be termed $X_{PS}(k)$ while individual vectors of the V[k] matrix may also be termed v(k).

An analysis of the U, S and V matrices may reveal that the matrices carry or represent spatial and temporal characteristics of the underlying soundfield represented above by X. Each of the N vectors in U (of length M samples) may represent normalized separated audio signals as a function of time (for the time period represented by M samples), that are orthogonal to each other and that have been decoupled from any spatial characteristics (which may also be referred to as directional information). The spatial characteristics, representing spatial shape and position (r, theta, phi) may instead be represented by individual $i^{th}$ vectors, $v^{(i)}(k)$, in the V matrix (each of length $(N+1)^2$). The individual elements of each of $v^{(i)}(k)$ vectors may represent an HOA coefficient describing the shape (including width) and position of the soundfield for an associated audio object. Both the vectors in the U matrix and the V matrix are normalized such that their root-mean-square energies are equal to unity. The energy of the audio signals in U is thus represented by the diagonal elements in S. Multiplying U and S to form US[k] (with individual vector elements $X_{PS}(k)$), thus represent the audio signal with energies. The ability of the SVD decomposition to decouple the audio time-signals (in U), their energies (in S) and their spatial characteristics (in V) may support various aspects of the techniques described in this disclosure. Further, the model of synthesizing the underlying HOA[k] coefficients, X, by a vector multiplication of US[k] and V[k] gives rise the term "vector-based decomposition," which is used throughout this document.

Although described as being performed directly with respect to the HOA coefficients 11, the LIT unit 30 may apply the linear invertible transform to derivatives of the HOA coefficients 11. For example, the LIT unit 30 may apply SVD with respect to a power spectral density matrix derived from the HOA coefficients 11. By performing SVD with respect to the power spectral density (PSD) of the HOA coefficients rather than the coefficients themselves, the LIT unit 30 may potentially reduce the computational complexity of performing the SVD in terms of one or more of processor cycles and storage space, while achieving the same source audio encoding efficiency as if the SVD were applied directly to the HOA coefficients.

The parameter calculation unit 32 represents a unit configured to calculate various parameters, such as a correlation parameter (R), directional properties parameters (θ, φ, r), and an energy property (e). Each of the parameters for the current frame may be denoted as R[k], θ[k], φ[k], r[k] and e[k]. The parameter calculation unit 32 may perform an energy analysis and/or correlation (or so-called cross-correlation) with respect to the US[k] vectors 33 to identify the parameters. The parameter calculation unit 32 may also determine the parameters for the previous frame, where the previous frame parameters may be denoted R[k−1], θ[k−1], φ[k−1], r[k−1] and e[k−1], based on the previous frame of US[k−1] vector and V[k−1] vectors. The parameter calculation unit 32 may output the current parameters 37 and the previous parameters 39 to reorder unit 34.

The parameters calculated by the parameter calculation unit 32 may be used by the reorder unit 34 to re-order the audio objects to represent their natural evaluation or continuity over time. The reorder unit 34 may compare each of the parameters 37 from the first US[k] vectors 33 turn-wise against each of the parameters 39 for the second US[k−1] vectors 33. The reorder unit 34 may reorder (using, as one example, a Hungarian algorithm) the various vectors within the US[k] matrix 33 and the V[k] matrix 35 based on the current parameters 37 and the previous parameters 39 to output a reordered US[k] matrix 33' (which may be denoted mathematically as $\overline{US}[k]$) and a reordered V[k] matrix 35' (which may be denoted mathematically as $\overline{V}[k]$) to a foreground sound (or predominant sound—PS) selection unit 36 ("foreground selection unit 36") and an energy compensation unit 38.

The soundfield analysis unit 44 may represent a unit configured to perform a soundfield analysis with respect to the HOA coefficients 11 so as to potentially achieve a target bitrate 41. The soundfield analysis unit 44 may, based on the analysis and/or on a received target bitrate 41, determine the total number of psychoacoustic coder instantiations (which may be a function of the total number of ambient or background channels ($BG_{TOT}$) and the number of foreground channels or, in other words, predominant channels. The total number of psychoacoustic coder instantiations can be denoted as numHOATransportChannels.

The soundfield analysis unit 44 may also determine, again to potentially achieve the target bitrate 41, the total number of foreground channels (nFG) 45, the minimum order of the background (or, in other words, ambient) soundfield ($N_{BG}$ or, alternatively, MinAmbHOAorder), the corresponding number of actual channels representative of the minimum order of background soundfield (nBGa=(MinAmbHOAorder+1)$^2$), and indices (i) of additional BG HOA channels to send (which may collectively be denoted as background channel information 43 in the example of FIG. 3). The background channel information 42 may also be referred to as ambient channel information 43. Each of the channels that remains from numHOATransportChannels—nBGa, may either be an "additional background/ambient channel", an "active vector-based predominant channel", an "active directional based predominant signal" or "completely inactive". In one aspect, the channel types may be indicated (as a "ChannelType") syntax element by two bits (e.g. 00: directional based signal; 01: vector-based predominant signal; 10: additional ambient signal; 11: inactive signal). The total number of background or ambient signals, nBGa, may be given by (MinAmbHOAorder+1)$^2$+the number of times the index 10 (in the above example) appears as a channel type in the bitstream for that frame.

The soundfield analysis unit 44 may select the number of background (or, in other words, ambient) channels and the number of foreground (or, in other words, predominant) channels based on the target bitrate 41, selecting more background and/or foreground channels when the target bitrate 41 is relatively higher (e.g., when the target bitrate 41 equals or is greater than 512 Kbps). In one aspect, the numHOATransportChannels may be set to 8 while the MinAmbHOAorder may be set to 1 in the header section of the bitstream. In this scenario, at every frame, four channels may be dedicated to represent the background or ambient portion of the soundfield while the other 4 channels can, on a frame-by-frame basis vary on the type of channel—e.g., either used as an additional background/ambient channel or a foreground/predominant channel. The foreground/predominant signals can be one of either vector-based or directional based signals, as described above.

In some instances, the total number of vector-based predominant signals for a frame, may be given by the number of times the ChannelType index is 01 in the bitstream of that frame. In the above aspect, for every additional background/ambient channel (e.g., corresponding to a ChannelType of 10), corresponding information of which of the possible HOA coefficients (beyond the first four) may be represented in that channel. The information, for fourth order HOA content, may be an index to indicate the HOA coefficients 5-25. The first four ambient HOA coefficients 1-4 may be sent all the time when minAmbHOAorder is set to 1, hence the audio encoding device may only need to indicate one of the additional ambient HOA coefficients having an index of 5-25. The information could thus be sent using a 5 bits syntax element (for $4^{th}$ order content), which may be denoted as "CodedAmbCoeffIdx." In any event, the soundfield analysis unit 44 outputs the background channel information 43 and the HOA coefficients 11 to the background (BG) selection unit 36, the background channel information 43 to coefficient reduction unit 46 and the bitstream generation unit 42, and the nFG 45 to a foreground selection unit 36.

The background selection unit 48 may represent a unit configured to determine background or ambient HOA coefficients 47 based on the background channel information (e.g., the background soundfield ($N_{BG}$) and the number (nBGa) and the indices (i) of additional BG HOA channels to send). For example, when $N_{BG}$ equals one, the background selection unit 48 may select the HOA coefficients 11 for each sample of the audio frame having an order equal to or less than one. The background selection unit 48 may, in this example, then select the HOA coefficients 11 having an index identified by one of the indices (i) as additional BG HOA coefficients, where the nBGa is provided to the bitstream generation unit 42 to be specified in the bitstream 21 so as to enable the audio decoding device, such as the audio decoding device 24 shown in the example of FIGS. 2 and 4, to parse the background HOA coefficients 47 from the bitstream 21. The background selection unit 48 may then output the ambient HOA coefficients 47 to the energy compensation unit 38. The ambient HOA coefficients 47 may have dimensions D: M×[$(N_{BG}+1)^2$+nBGa]. The ambient HOA coefficients 47 may also be referred to as "ambient HOA coefficients 47," where each of the ambient HOA coefficients 47 corresponds to a separate ambient HOA channel 47 to be encoded by the psychoacoustic audio coder unit 40.

The foreground selection unit 36 may represent a unit configured to select the reordered US[k] matrix 33' and the reordered V[k] matrix 35' that represent foreground or distinct components of the soundfield based on nFG 45 (which may represent a one or more indices identifying the foreground vectors). The foreground selection unit 36 may output nFG signals 49 (which may be denoted as a reordered $US[k]_{1, \ldots, nFG}$ 49, $FG_{1, \ldots, nfG}[k]$ 49, or $X_{PS}^{(1 \ldots nFG)}(k)$ 49) to the psychoacoustic audio coder unit 40, where the nFG signals 49 may have dimensions D: M×nFG and each represent mono-audio objects. The foreground selection unit 36 may also output the reordered V[k] matrix 35' (or $v^{(1 \ldots nFG)}(k)$ 35') corresponding to foreground components of the soundfield to the spatio-temporal interpolation unit 50, where a subset of the reordered V[k] matrix 35' corresponding to the foreground components may be denoted as foreground V[k] matrix $\mathbf{51}_k$ (which may be mathematically denoted as $\overline{V}_{1, \ldots, nFG}[k]$) having dimensions D: $(N+1)^2$× nFG.

The energy compensation unit 38 may represent a unit configured to perform energy compensation with respect to the ambient HOA coefficients 47 to compensate for energy loss due to removal of various ones of the HOA channels by the background selection unit 48. The energy compensation unit 38 may perform an energy analysis with respect to one or more of the reordered US[k] matrix 33', the reordered V[k] matrix 35', the nFG signals 49, the foreground V[k] vectors $\mathbf{51}_k$ and the ambient HOA coefficients 47 and then perform energy compensation based on the energy analysis to generate energy compensated ambient HOA coefficients 47'. The energy compensation unit 38 may output the energy compensated ambient HOA coefficients 47' to the psychoacoustic audio coder unit 40.

The spatio-temporal interpolation unit 50 may represent a unit configured to receive the foreground V[k] vectors $\mathbf{51}_k$ for the $k^{th}$ frame and the foreground V[k−1] vectors $\mathbf{51}_{k-1}$ for the previous frame (hence the k−1 notation) and perform spatio-temporal interpolation to generate interpolated foreground V[k] vectors. The spatio-temporal interpolation unit 50 may recombine the nFG signals 49 with the foreground V[k] vectors $\mathbf{51}_k$ to recover reordered foreground HOA coefficients. The spatio-temporal interpolation unit 50 may then divide the reordered foreground HOA coefficients by the interpolated V[k] vectors to generate interpolated nFG signals 49'. The spatio-temporal interpolation unit 50 may also output the foreground V[k] vectors $\mathbf{51}_k$ that were used to generate the interpolated foreground V[k] vectors so that an audio decoding device, such as the audio decoding device 24, may generate the interpolated foreground V[k] vectors and thereby recover the foreground V[k] vectors $\mathbf{51}_k$. The foreground V[k] vectors $\mathbf{51}_k$ used to generate the interpolated foreground V[k] vectors are denoted as the remaining foreground V[k] vectors 53. In order to ensure that the same V[k] and V[k−1] are used at the encoder and decoder (to create the interpolated vectors V[k]) quantized/dequantized versions of the vectors may be used at the encoder and decoder. The spatio-temporal interpolation unit 50 may output the interpolated nFG signals 49' to the psychoacoustic audio coder unit 46 and the interpolated foreground V[k] vectors $\mathbf{51}_k$ to the coefficient reduction unit 46.

The coefficient reduction unit 46 may represent a unit configured to perform coefficient reduction with respect to the remaining foreground V[k] vectors 53 based on the background channel information 43 to output reduced foreground V[k] vectors 55 to the quantization unit 52. The reduced foreground V[k] vectors 55 may have dimensions D: $[(N+1)^2-(N_{BG}+1)^2-BG_{TOT}]$×nFG. The coefficient reduction unit 46 may, in this respect, represent a unit configured to reduce the number of coefficients in the remaining foreground V[k] vectors 53. In other words, coefficient reduction unit 46 may represent a unit configured to eliminate the coefficients in the foreground V[k] vectors (that form the remaining foreground V[k] vectors 53) having little to no directional information. In some examples, the coefficients of the distinct or, in other words, foreground V[k] vectors corresponding to a first and zero order basis functions (which may be denoted as $N_{BG}$) provide little directional information and therefore can be removed from the foreground V-vectors (through a process that may be referred to as "coefficient reduction"). In this example, greater flexibility may be provided to not only identify the coefficients that correspond $N_{BG}$ but to identify additional HOA channels (which may be denoted by the variable TotalOfAddAmbHOAChan) from the set of $[(N_{BG}+1)^2+1, (N+1)^2]$.

The quantization unit 52 may represent a unit configured to perform any form of quantization to compress the reduced foreground V[k] vectors 55 to generate coded foreground V[k] vectors 57, outputting the coded foreground V[k] vectors 57 to the bitstream generation unit 42. In operation, the quantization unit 52 may represent a unit configured to compress a spatial component of the soundfield, i.e., one or more of the reduced foreground V[k] vectors 55 in this example. The quantization unit 52 may perform any one of the following 12 quantization modes, as indicated by a quantization mode syntax element denoted "NbitsQ":

| NbitsQ value | Type of Quantization Mode |
|---|---|
| 0-3: | Reserved |
| 4: | Vector Quantization |
| 5: | Scalar Quantization without Huffman Coding |
| 6: | 6-bit Scalar Quantization with Huffman Coding |
| 7: | 7-bit Scalar Quantization with Huffman Coding |
| 8: | 8-bit Scalar Quantization with Huffman Coding |
| . . . | . . . |
| 16: | 16-bit Scalar Quantization with Huffman Coding |

The quantization unit 52 may also perform predicted versions of any of the foregoing types of quantization modes, where a difference is determined between an element of (or a weight when vector quantization is performed) of the V-vector of a previous frame and the element (or weight when vector quantization is performed) of the V-vector of a current frame is determined. The quantization unit 52 may then quantize the difference between the elements or weights of the current frame and previous frame rather than the value of the element of the V-vector of the current frame itself.

The quantization unit 52 may perform multiple forms of quantization with respect to each of the reduced foreground V[k] vectors 55 to obtain multiple coded versions of the reduced foreground V[k] vectors 55. The quantization unit 52 may select the one of the coded versions of the reduced foreground V[k] vectors 55 as the coded foreground V[k] vector 57. The quantization unit 52 may, in other words, select one of the non-predicted vector-quantized V-vector, predicted vector-quantized V-vector, the non-Huffman-coded scalar-quantized V-vector, and the Huffman-coded scalar-quantized V-vector to use as the output switched-quantized V-vector based on any combination of the criteria discussed in this disclosure. In some examples, the quantization unit 52 may select a quantization mode from a set of quantization modes that includes a vector quantization mode and one or more scalar quantization modes, and quantize an input V-vector based on (or according to) the selected mode. The quantization unit 52 may then provide the selected one of the non-predicted vector-quantized V-vector (e.g., in terms of weight values or bits indicative thereof), predicted vector-quantized V-vector (e.g., in terms of error values or bits indicative thereof), the non-Huffman-coded scalar-quantized V-vector and the Huffman-coded scalar-quantized V-vector to the bitstream generation unit 52 as the coded foreground V[k] vectors 57. The quantization unit 52 may also provide the syntax elements indicative of the quantization mode (e.g., the NbitsQ syntax element) and any other syntax elements used to dequantize or otherwise reconstruct the V-vector.

The psychoacoustic audio coder unit 40 included within the audio encoding device 20 may represent multiple instances of a psychoacoustic audio coder, each of which is used to encode a different audio object or HOA channel of each of the energy compensated ambient HOA coefficients 47' and the interpolated nFG signals 49' to generate encoded ambient HOA coefficients 59 and encoded nFG signals 61. The psychoacoustic audio coder unit 40 may output the encoded ambient HOA coefficients 59 and the encoded nFG signals 61 to the bitstream generation unit 42.

The bitstream generation unit 42 included within the audio encoding device 20 represents a unit that formats data to conform to a known format (which may refer to a format known by a decoding device), thereby generating the vector-based bitstream 21. The bitstream 21 may, in other words, represent encoded audio data, having been encoded in the manner described above. The bitstream generation unit 42 may represent a multiplexer in some examples, which may receive the coded foreground V[k] vectors 57, the encoded ambient HOA coefficients 59, the encoded nFG signals 61 and the background channel information 43. The bitstream generation unit 42 may then generate a bitstream 21 based on the coded foreground V[k] vectors 57, the encoded ambient HOA coefficients 59, the encoded nFG signals 61 and the background channel information 43. In this way, the bitstream generation unit 42 may thereby specify the vectors 57 in the bitstream 21 to obtain the bitstream 21. The bitstream 21 may include a primary or main bitstream and one or more side channel bitstreams.

Various aspects of the techniques may also enable the bitstream generation unit 46 to, as described above, specify audio rendering information 2 in the bitstream 21. While the current version of the upcoming 3D audio compression working draft, provides for signaling specific downmix matrices within the bitstream 21, the working draft does not provide for specifying of renderers used in rendering HOA coefficients 11 in the bitstream 21. For HOA content, the equivalent of such downmix matrix is the rendering matrix which converts the HOA representation into the desired loudspeaker feeds. Various aspects of the techniques described in this disclosure propose to further harmonize the feature sets of channel content and HOA by allowing the bitstream generation unit 46 to signal HOA rendering matrices within the bitstream (as, for example, audio rendering information 2).

One exemplary signaling solution based on the coding scheme of downmix matrices and optimized for HOA is presented below. Similar to the transmission of downmix matrices, HOA rendering matrices may be signaled within the mpegh3daConfigExtension( ). The techniques may provide for a new extension type ID_CONFIG_EXT_HOA_MATRIX as set forth in the following tables (with italics and bold indicating changes to the existing table).

TABLE

Syntax of mpegh3daConfigExtension( ) (Table 13 in CD)

| Syntax | No. of bits | Mnemonic |
|---|---|---|
| mpegh3daConfigExtension( ) | | |
| { | | |
| numConfigExtensions = escapedValue(2,4,8) + 1; | | |
| for (confExtIdx=0; confExtIdx<numConfigExtensions; confExtIdx++) { | | |
| usacConfigExtType[confExtIdx] = escapedValue(4,8,16); | | |
| usacConfigExtLength[confExtIdx] = escapedValue(4,8,16); | | |
| switch (usacConfigExtType[confExtIdx]) { | | |
| case ID_CONFIG_EXT_FILL: | | |
| while (usacConfigExtLength[confExtIdx]--) { | | |
| **fill_byte[i];** /* should be '10100101' */ | **8** | **uimsbf** |
| } | | |
| break; | | |
| case ID_CONFIG_EXT_DMX_MATRIX: | | |
| DownmixMatrixSet( ) | | |
| break; | | |
| *case ID_CONFIG_EXT_HOA_MATRIX:* | | |
| *HOARenderingMatrixSet( )* | | |
| *break;* | | |
| case ID_CONFIG_EXT_LOUDNESS_INFO: | | |
| loudnessInfoSet ( ); | | |
| break; | | |
| default: | | |
| while (usacConfigExtLength[confExtIdx]--) { | | |
| **tmp;** | **8** | **uimsbf** |
| } | | |

TABLE-continued

| Syntax of mpegh3daConfigExtension( ) (Table 13 in CD) | | |
|---|---|---|
| Syntax | No. of bits | Mnemonic |
| break; | | |
| } | | |
| } | | |
| } | | |

TABLE

| Value of usacConfigExtType (Table 1 in CD) | |
|---|---|
| usacConfigExtType | Value |
| ID_CONFIG_EXT_FILL | 0 |
| ID_CONFIG_EXT_DMX_MATRIX | 1 |
| ID_CONFIG_EXT_LOUDNESS_INFO | 2 |
| *ID CONFIG EXT HOA MATRIX* | *3* |
| /* reserved for ISO use */ | *4*-127 |
| /* reserved for use outside of ISO scope */ | 128 and higher |

The bitfield HOARenderingMatrixSet( ) may be equal in structure and functionality compared to the DownmixMatrixSet( ). Instead of the inputCount(audioChannelLayout), the HOARenderingMatrixSet( ) may use the "equivalent" NumOfHoaCoeffs value, computed in HOAConfig. Further, because the ordering of the HOA coefficients may be fixed within the HOA decoder (see, e.g., Annex G in the CD), the HOARenderingMatrixSet does not need any equivalent to inputConfig(audioChannelLayout).

TABLE 2

| Syntax of HOARenderingMatrixSet( ) (adopted from Table 15 in CD) | | |
|---|---|---|
| Syntax | No. of bits | Mnemonic |
| HOARenderingMatrixSet( ) | | |
| { | | |
| **numHOARenderingMatrices** | **5** | **Uimsbf** |
| for (k=0; k< numHOARenderingMatrices; ++k) { | | |
| **downmixId;** | **6** | **Uimsbf** |
| **CICPspeakerLayoutIdx;** | **6** | **Uimsbf** |
| **DmxMatrixLenBits** = escapedValue(8,8,12); | **8 . . . 28** | |
| HOARenderingMatrix (NumOfHoaCoeffs, outputConfig(CICPspeakerLayoutIdx), outputCount(CICPspeakerLayoutIdx) ); | **DmxMatrixLenBits** | |
| } | | |
| } | | |

Various aspects of the techniques may also enable the bitstream generation unit 46 to, when compressing the HOA audio data (e.g., the HOA coefficients 11 in the example of FIG. 4) using a first compression scheme (such as the decomposition compression scheme represented by vector-based decomposition unit 27), specify the bitstream 21 such that bits corresponding to a second compression scheme (e.g., the directional-based compression scheme or directionality-based compression scheme represented by direction-based decomposition unit 28) are not included in the bitstream 21. For example, the bitstream generation unit 42 may generate the bitstream 21 so as not to include HOAPredictionInfo syntax elements or field that may be reserved for use to specify prediction information between directional signals of the directional-based compression scheme. Examples of the bitstream 21 generated in accordance with various aspects of the techniques described in this disclosure are shown in the examples of FIGS. 8E and 8F.

In other words, the prediction of directional signals may be part of the Predominant Sound Synthesis employed by the directional-based decomposition unit 28 and depends on the existence of ChannelType 0 (which may indicate a direction-based signal). When no direction-based signal is present within a frame, no prediction of directional signals may be performed. However, the associated sideband information HOAPredictionInfo( ) may, even though not used, be written to every frame independently of the existence of direction-based signals. When no directional signal exists within a frame, the techniques described in this disclosure may enable the bitstream generation unit 42 to reduce the size of the sideband by not signaling HOAPredictionInfo in the sideband as set forth in the following Table (where the italics with underlining denote additions):

TABLE

| Syntax of HOAFrame | | |
|---|---|---|
| Syntax | No. of bits | Mnemonic |
| HOAFrame(usacIndependencyFlag) | | |
| { | | |
| NumOfDirSigs = 0; | | |
| NumOfVecSigs = 0; | | |
| NumOfContAddHoaChans = 0; | | |
| if(usacIndependencyFlag){ | | |

TABLE-continued

| Syntax of HOAFrame | | |
|---|---|---|
| Syntax | No. of bits | Mnemonic |
| hoaIndependencyFlag = usacIndependencyFlag; | | |
| } | | |
| else{ | | |
| **hoaIndependencyFlag;** | **1** | **bslbf** |
| } | | |
| for(i=0; i< NumOfAdditionalCoders; ++i){ | | |
| ChannelSideInfoData(i); | | |
| *if (MaxGainCorrAmpExp>0)* | | |
| { HOAGainCorrectionData(i); } | | |
| switch ChannelType[i] { | | |
| case 0: | | |
| DirSigChannelIds[NumOfDirSigs] = i + 1; | | |
| NumOfDirSigs++; | | |
| break; | | |
| case 1: | | |
| VecSigChannelIds[NumOfVecSigs] = i + 1; | | |
| NumOfVecSigs++; | | |
| break; | | |
| case 2: | | |
| if (AmbCoeffTransitionState[i] == 0) { | | |
| ContAddHoaCoeff [NumOfContAddHoaChans] = AmbCoeffIdx[i]; | | |
| NumOfContAddHoaChans++; | | |
| } | | |
| break; | | |
| } | | |
| } | | |
| *if (MaxGainCorrAmpExp>0)* { | | |
| for ( i= NumOfAdditionalCoders; | | |
| i< NumHOATransportChannels; ++i){ | | |
| HOAGainCorrectionData(i); | | |
| } | | |
| } | | |
| for(i=0; i< NumOfVecSigs; ++i){ | | |
| VVectorData ( VecSigChannelIds(i) ); | | |
| } | | |
| *if (NumOfDirSigs>0)* | | |
| { HOAPredictionInfo( DirSigChannelIds, NumOfDirSigs ); } | | |
| byte_alignment( ); | | |
| } | | |

In this respect, the techniques may enable a device, such as the audio encoding device 20, to be configured to, when compressing higher order ambisonic audio data using a first compression scheme, specify a bitstream representative of a compressed version of the higher order ambisonic audio data that does not include bits corresponding to a second compression scheme also used to compress the higher order ambisonic audio data.

In some instances, the first compression scheme comprises a vector-based decomposition compression scheme. In these and other instances, the vector based decomposition compression scheme comprises a compression scheme that involves application of a singular value decomposition (or equivalents thereof described in more detail in this disclosure) to the higher order ambisonic audio data.

In these and other instances, the audio encoding device 20 may be configured to specify the bitstream that does not include the bits correspond to at least one syntax element used for performing the second type of compression scheme. The second compression scheme may, as noted above, comprises a directionality-based compression scheme.

The audio encoding device 20 may also be configured to specify the bitstream 21 such that the bitstream 21 does not include the bits corresponding to an HOAPredictionInfo syntax element of the second compression scheme.

When the second compression scheme comprises a directionality-based compression scheme, the audio encoding device 20 may be configured to specify the bitstream 21 such that the bitstream 21 does not include the bits corresponding to an HOAPredictionInfo syntax element of the directionality-based compression scheme. In other words, the audio encoding device 20 may be configured to specify the bitstream 21 such that the bitstream 21 does not include the bits correspond to at least one syntax element used for performing the second type of compression schemes, the at least one syntax element indicative of a prediction between two or more directional-based signals. Restated yet again, when the second compression scheme comprises a directionality-based compression scheme, the audio encoding device 20 may be configured to specify the bitstream 21 such that the bitstream 21 does not include the bits corresponding to an HOAPredictionInfo syntax element of the directionality-based compression scheme, where the HOAPredictionInfo syntax element is indicative of a prediction between two or more directional-based signals.

Various aspects of the techniques may further enable the bitstream generation unit 46 to specify the bitstream 21 in certain instances such that the bitstream 21 does not include gain correction data. The bitstream generation unit 46 may, when gain correction is suppressed, specify the bitstream 21 such that the bitstream 21 does not include the gain correction data. Examples of the bitstream 21 generated in accordance with various aspects of the techniques are shown, as noted above, in the examples of FIGS. 8E and 8F.

In some instances, gain correction is applied when certain types of psychoacoustic encoding is performed given the relatively smaller dynamic range of these certain types of psychoacoustic encoding in comparison to other types of psychoacoustic encoding. For example, AAC has a relatively smaller dynamic range than unified speech and audio coding (USAC). When the compression scheme (such as a vector-based synthesis compression scheme or a directional-based compression scheme) involves USAC, the bitstream generation unit 46 may signal in the bitstream 21 that gain correction has been suppressed (e.g., by specifying a syntax element MaxGainCorrAmpExp in the HOAConfig with a value of zero in the bitstream 21) and then specify the bitstream 21 so as not to include the gain correction data (in a HOAGainCorrectionData( ) field).

In other words, the bitfield MaxGainCorrAmpExp as part of the HOAConfig (see Table 71 in the CD) may control the extent to which the automatic gain control module affects the transport channel signals prior the USAC core coding. In some instances, this module was developed for RM0 to improve the non-ideal dynamic range of the available AAC encoder implementation. With the change from AAC to the USAC core coder during the integration phase, the dynamic range of the core encoder may improve and therefore, the need for this gain control module may not be as critical as before.

In some instances, the gain control functionality can be suppressed if MaxGainCorrAmpExp is set to 0. In these instances, the associated sideband information HOAGainCorrectionData( ) may not be written to every HOA frame per the above table illustrating the "Syntax of HOAFrame." For the configuration where MaxGainCorrAmpExp is set to 0, the techniques described in this disclosure may not signal the HOAGainCorrectionData. Further, in such scenario the inverse gain control module may even be bypassed, reducing the decoder complexity by about 0.05 MOPS per transport channel without any negative side effect.

In this respect, the techniques may configure the audio encoding device 20 to, when gain correction is suppressed during compression of higher order ambisonic audio data, specify the bitstream 21 representative of a compressed version of the higher order ambisonic audio data such that the bitstream 21 does not include gain correction data.

In these and other instances, the audio encoding device 20 may be configured to compress the higher order ambisonic audio data in accordance with a vector-based decomposition compression scheme to generate the compressed version of the higher order ambisonic audio data. Examples of the decomposition compression scheme may involve application of a singular value decomposition (or equivalents thereof described in more detail above) to the higher order ambisonic audio data to generate the compressed version of the higher order ambisonic audio data.

In these and other instances, the audio encoding device 20 may be configured to specify a MaxGainCorrAmbExp syntax element in the bitstream 21 as zero to indicate that the gain correction is suppressed. In some instances, the audio encoding device 20 may be configured to specify, when the gain correction is suppressed, the bitstream 21 such that the bitstream 21 does not include a HOAGainCorrection data field that stores the gain correction data. In other words, the audio encoding device 20 may be configured to specify a MaxGainCorrAmbExp syntax element in the bitstream 21 as zero to indicate that the gain correction is suppressed and not including in the bitstream a HOAGainCorrection data field that stores the gain correction data.

In these and other instances, the audio encoding device 20 may be configured to suppress the gain correction when the compression of the higher order ambisonic audio data includes application of a unified audio speech and speech audio coding (USAC) to the higher order ambisonic audio data.

The foregoing potential optimizations to the signaling of various information in the bitstream 21 may be adapted or otherwise updated in the manner described in further detail below. The updates may be applied in conjunction with other updates discussed below or used to update only various aspects of the optimizations discussed above. As such, each potential combination of updates to the optimizations described above are considered, including application of a single update described below to the optimizations described above or any particular combinations of the updates described below to the optimizations described above.

To specify a matrix in the bitstream, the bitstream generation unit 42 may, for example, specify an ID_CONFIG_EXT_HOA_MATRIX in a mpegh3daConfigExtension ( ) of the bitstream 21, as shown below as bolded and highlighted in the following Table. The following Table is representative of the syntax for specifying the mpegh3daConfigExtension( ) portion of the bitstream 21:

TABLE

Syntax of mpegh3daConfigExtension( )

| Syntax | No. of bits | Mnemonic |
|---|---|---|
| mpegh3daConfigExtension( ) | | |
| { | | |
| numConfigExtensions = escapedValue(2,4,8) + 1; | | |
| for (confExtIdx=0; confExtIdx<numConfigExtensions; confExtIdx++) { | | |
| usacConfigExtType[confExtIdx] = escapedValue(4,8,16); | | |
| usacConfigExtLength[confExtIdx] = escapedValue(4,8,16); | | |
| switch (usacConfigExtType[confExtIdx]) { | | |
| case ID_CONFIG_EXT_FILL: | | |
| while (usacConfigExtLength[confExtIdx]−−) { | | |
| **fill_byte[i];** /* should be '10100101' */ | **8** | **uimsbf** |
| } | | |
| break; | | |
| case ID_CONFIG_EXT_DOWNMIX: | | |
| downmixConfig( ); | | |
| break; | | |
| case ID_CONFIG_EXT_LOUDNESS_INFO: | | |
| loudnessInfoSet( ); | | |
| break; | | |

TABLE-continued

Syntax of mpegh3daConfigExtension( )

| Syntax | No. of bits | Mnemonic |
|---|---|---|
| case ID_CONFIG_EXT_AUDIOSCENE_INFO: | | |
| mae_AudioSceneInfo( ); | | |
| break; | | |
| ***case ID_CONFIG_EXT_HOA_MATRIX :*** | | |
| ***HoaRenderingMatrixSet();*** | | |
| ***break;*** | | |
| default: | | |
| while (usacConfigExtLength[confExtIdx]−−) { | | |
| **tmp;** | **8** | **uimsbf** |
| } | | |
| break; | | |
| } | | |
| } | | |
| } | | |

The ID_CONFIG_EXT_HOA_MATRIX in the foregoing Table provides for a container in which to specify the rendering matrix, the container denoted as "HoaRendering-MatrixSet( )".

The contents of the HoaRenderingMatrixSet( ) container may be defined in accordance with the syntax set forth in the following Table:

TABLE

Syntax of HoaRenderingMatrixSet( )

| Syntax | No. of bits | Mnemonic |
|---|---|---|
| HoaRenderingMatrixSet( ) | | |
| { | | |
| **numHoaRenderingMatrices**; | **5** | **uimsbf** |
| for (k=0; k< numHoaRenderingMatrices; ++k) { | | |
| **HoaRenderingMatrixId;** | **7** | **uimsbf** |
| **CICPspeakerLayoutIdx;** | **6** | **uimsbf** |
| **HoaMatrixLenBits** = escapedValue(8,8,12); | **8 . . . 28** | |
| HoaRenderingMatrix(NumOfHoaCoeffs | **HoaMatrixLenBits** | |
| outputConfig(CICPspeakerLayoutIdx), | | |
| outputCount(CICPspeakerLayoutIdx) ); | | |
| } | | |
| } | | |

trixLenBits (which may also be denoted as the "HoaRenderingMatrixLenBits") syntax element may specify a length of the following bit stream element (e.g., the HoaRenderingMatrix( ) container) in bits.

The HoaRenderingMatrix( ) container includes a NumOfHoaCoeffs followed by an outputConfig( ) container and an outputCount( ) container. The outputConfig( ) container may As shown in the Table directly above, the HoaRendering-MatrixSet( ) includes a number of different syntax elements, including a numHoaRenderingMatrices, an HoaRendereringMatrixId, a CICPspeakerLayoutIdx, an HoaMatrixLenBits and a HoARenderingMatrix.

The numHoaRenderingMatrices syntax element may specify a number of HoaRendereringMatrixId definitions present in the bitstream element. The HoaRenderingMatrixId syntax element may represent a field that uniquely defines an Id for a default HOA rendering matrix available on the decoder side or a transmitted HOA rendering matrix. In this respect, the HoaRenderingMatrixId may represent an example of the signal value that includes two or more bits that define an index that indicates that the bitstream includes a matrix used to render spherical harmonic coefficients to a plurality of speaker feeds or the signal value that includes two or more bits defining an index associated with one of a plurality of matrices used to render spherical harmonic coefficients to a plurality of speaker feeds. The CICPspeakerLayoutIdx syntax element may represent a value that describes the output loudspeaker layout for the given HOA rendering matrix and may correspond to a ChannelConfiguration element defined in ISO/IEC 23000 1-8. The HoaMainclude channel configuration vectors specifying the information about each loudspeaker. The bitstream generation unit 42 may assume this loudspeaker information to be known from the channel configurations of the output layout. Each entry, outputConfig[i], may represent a data structure with the following members:

- AzimuthAngle (which may denote the absolute value of the speaker azimuth angle);
- AzimuthDirection (which may denote the azimuth direction using, as one example, 0 for left and 1 for right);
- Elevation Angle (which may denote the absolute value of the speaker elevation angles);
- ElevationDirection (which may denote the elevation direction using, as one example, 0 for up and 1 for down); and
- isLFE (which may indicate whether the speaker is a low frequency effect (LFE) speaker).

The bitstream generation unit 42 may invoke a helper function, in some instances, denoted as "findSymmetricSpeakers," which may further specify the following:

- pairType (which may store a value of SYMMETRIC (meaning a symmetric pair of two speakers in some example), CENTER, or ASYMMETRIC); and symmetricPair->originalPosition (which may denote the position in the original channel configuration of the second (e.g., right) speaker in the group, for SYMMETRIC groups only).

The outputCount( ) container may specify a number of loudspeakers for which the HOA rendering matrix is defined.

The bitstream generation unit 42 may specify the HoaRenderingMatrix( ) container in accordance with the syntax set forth in the following Table:

TABLE

Syntax of HoaRenderingMatrix( )

| Syntax | No. of bits | Mnemonic |
|---|---|---|
| HoaRenderingMatrix ( ) | | |
| { | | |
| lfeExist = 0; | | |
| hasLfeRendering = 0; | | |
| for (i=0; i< inputCount; ++i) | | |
| isHoaCoefSparse[i] = 0; | | |
| **precisionLevel** | 1 | **uimsbf** |
| If (**gainLimitPerHoaOrder**) { | 1 | **uimsbf** |
| for (i = 0; i<(maxHoaOrder+1); ++i ) { | | |
| maxGain[i] = − escapedValue(3, 5, 5); | | |
| minGain[i] = −(escapedValue(4, 5, 6) + 1 − maxGain[i]); | | |
| } | | |
| } else { | | |
| maxGain[0] = − escapedValue (3, 5, 5); | | |
| minGain[0] = −( escapedValue (4, 5, 6) + 1− maxGain[0]); | | |
| for (i = 1; i<(maxHoaOrder+1); ++i ) { | | |
| maxGain[i] = maxGain[0]; | | |
| minGain[i] = minGain[0]; | | |
| } | | |
| } | | |
| If (**isFullMatrix**) { | 1 | **uimsbf** |
| **firstSparseOrder** | 1 | **uimsbf** |
| for (i = (firstSparseOrder*firstSparseOrder); i<inputCount; ++i) | | |
| isHoaCoefSparse[i] = 1; | | |
| } | | |
| for (i=0; i< outputCount; ++i){ | | |
| if (outputConfig[i].isLFE) | | |
| lfeExist = 1; | | |
| } | | |
| if (lfeExist) | | |
| **hasLfeRendering;** | 1 | **uimsbf** |
| numPairs = findSymmetricSpeakers(outputCount, outputConfig, hasLfeRendering); | | |
| for (i=0; i<numPairs; ++i) { | | |
| valueSymmetricPairs[i] = 0; | | |
| signSymmetricPairs[i] = 0; | | |
| } | | |
| **zerothOrderAlwaysPositive;** | 1 | **uimsbf** |
| if (**isAllValueSymmetric**) { | 1 | **uimsbf** |
| for (i=0; i<numPairs; ++i) { valueSymmetricPairs[i] = 1; } | | |
| } else { | | |
| if (**isAnyValueSymmetric**) { | 1 | **uimsbf** |
| for (i=0; i<numPairs; ++i) | | |
| valueSymmetricPairs[i] = **boolVal;** | 1 | **uimsbf** |
| If (**isAnySignSymmetric**) { | 1 | **uimsbf** |
| for (i=0; i<numPairs; ++i) { | | |
| if (0==valueSymmetricPairs[i]) | | |
| signSymmetricPairs[i] = **boolVal;** | 1 | **uimsbf** |
| } | | |
| } | | |
| } else { | | |
| if (**isAllSignSymmetric**) { | 1 | **uimsbf** |
| for (i=0; i<numPairs; ++i) | | |
| signSymmetricPairs[i] = 1; | | |
| } else { /* isAnyValueSymmetric==0 */ | | |
| if { **isAnySignSymmetric**) { | 1 | **uimsbf** |
| for (i=0; i<numPairs; ++i) | | |
| signSymmetricPairs[i] = **boolVal** | 1 | **uimsbf** |
| } | | |
| } | | |
| **hasVerticalCoef**; | 1 | **uimsbf** |
| DecodeHoaMatrixData( ) | | |
| } | | |

As shown in the Table directly above, the numPairs syntax element is set to the value output from invoking the findSymmetricSpeakers helper function using the outputCount and outputConfig and hasLfeRendering as inputs. The numPairs may therefore denote the number of symmetric loudspeaker pairs identified in the output loudspeaker setup which may be considered for efficient symmetry coding. The precisionLevel syntax element in the above Table may denote a precision used for uniform quantization of the gains according to the following Table:

TABLE

Uniform quantization step size of hoaGain as a function of the precisionLevel

| precisionLevel | smallest quantization step size [dB] |
|---|---|
| 0 | 1.0 |
| 1 | 0.5 |
| 2 | 0.25 |
| 3 | 0.125 |

The gainLimitPerHoaOrder syntax element shown in the above Table setting forth the syntax of HoaRenderingMatrix( ) may represent a flag indicating if the maxGain and minGain are individually specified for each order or for the entire HOA rendering matrix. The maxGain[i] syntax elements may specify a maximum actual gain in the matrix for coefficients for the HOA order i expressed, as one example, in decibels (dB). The minGain[i] syntax elements may specify a minimum actual gain in the matrix for coefficients of the HOA order i expressed, again as one example, in dB. The isFullMatrix syntax element may represent a flag indicating if the HOA rendering matrix is sparse or full. The firstSparseOrder syntax element may specify, in the case the HOA rendering matrix was specified as sparse per the isFullMatrix syntax element, the first HOA order which is sparsely coded. The isHoaCoefSparse syntax element may represent a bitmask vector derived from the firstSparseOrder syntax element. The lfeExists syntax element may represent a flag indicative of whether one or more LFEs exist in outputConfig. The hasLfeRendering syntax element indicates whether the rendering matrix contains non-zero elements for the one or more LFE channels. The zerothOrderAlwaysPositive syntax element may represent a flag indicative of whether the $0^{th}$ HOA order has only positive values.

The isAllValueSymmetric syntax element may represent a flag indicative of whether all symmetric loudspeaker pairs have equal absolute values in the HOA rendering matrix. The isAnyValueSymmetric syntax element represents a flag that indicates, when false for example, whether some of the symmetric loudspeaker pairs have equal absolute values in the HOA rendering matrix. The valueSymmetricPairs syntax element may represent a bitmask of length numPairs indicating the loudspeaker pairs with value symmetry. The isValueSymmetric syntax element may represent a bitmask derived in the manner shown in Table 3 from the valueSymmetricPairs syntax element. The isAllSignSymmetric syntax element may denote, when there are no value symmetries in the matrix, whether all symmetric loudspeaker pairs have at least number sign symmetries. The isAnySignSymmetric syntax element may represent a flag indicative of whether there are at least some symmetric loudspeaker pairs with number sign symmetries. The signSymmetricPairs syntax element may represent a bitmask of length numPairs indicating the loudspeaker pairs with sign-symmetry. The isSignSymmetric variable may represent a bitmask derived from the signSymmetricPairs syntax element in the manner shown above in Table setting forth the syntax of HoaRenderingMatrix( ). The hasVerticalCoef syntax element may represent a flag indicative of whether the matrix is a horizontal-only HOA rendering matrix. The bootVal syntax element may represent a variable used in the decoding loop.

In other words, the bitstream generation unit 42 may analyze the audio renderer 1 to generate any one or more of the above value symmetry information (e.g., any combination of one or more of the isAllValueSymmetric syntax element, isAnyValueSymmetric syntax element, valueSymmetricPairs syntax element, isValueSymmetric syntax element, and valueSymmetricPairs syntax element) or otherwise obtain the value symmetry information. The bitstream generation unit 42 may specify the audio renderer information 2 in the bitstream 21 in the manner shown above such that audio renderer information 2 includes the value sign symmetry information.

Moreover, the bitstream generation unit 42 may also analyze the audio renderer 1 to generate any one or more of the above sign symmetry information (e.g., any combination of one or more of the isAllSignSymmetric syntax element, isAnySignSymmetric syntax element, signSymmetricPairs syntax element, isSignSymmetric syntax element, and signSymmetricPairs syntax element) or otherwise obtain the sign symmetry information. The bitstream generation unit 42 may specify the audio renderer information 2 in the bitstream 21 in the manner shown above such that audio renderer information 2 includes the audio sign symmetry information.

When determining the value symmetry information and the sign symmetry information, the bitstream generation unit 42 may analyze the various values of audio renderer 1, which may be specified as a matrix. A rendering matrix may be formulated as a pseudo-inverse of a matrix R. In other words, to render $(N+1)^2$ HOA channels (denoted as Z below) to L loudspeaker signals (denoted by the column vector, p, of the L loudspeaker signals), the following equation may be given:

$$Z=R*p.$$

To arrive at the rendering matrix that outputs L loudspeaker signals, the inverse of the R matrix is multiplied by the Z HOA channels as shown in the following equation:

$$p=R^{-1}*Z.$$

Unless the number of loudspeaker channels, L, is the same as the number of Z HOA channels, $(N+1)^2$, the matrix R will not be square and a perfect inverse may not be determined. As a result, the pseudo-inverse may be used instead, which is defined as follows:

$$\mathrm{pinv}(R)=R^T(R*R^T)^{-1},$$

where $R^T$ denotes the transpose of the R matrix. Replacing $R^{-1}$ in the equation above, solving for the L loudspeaker signals denoted by the column vector p may be denoted mathematically as follows:

$$p=\mathrm{pinv}(R)*Z=R^T(R*R^T)^{-1}*Z.$$

The entries of the R matrix are the values of the spherical harmonics for the loudspeaker positions with $(N+1)^2$ rows for the different spherical harmonics and L columns for the speakers. The bitstream generation unit 42 may determine loudspeaker pairs based on the values for the speakers. Analyzing the values of the spherical harmonics for the loudspeaker positions, the bitstream generation unit 42 may determine based on the values which of the loudspeaker positions are pairs (e.g., as pairs may have similar, nearly the same, or the same values but with opposite signs).

After identifying the pairs, the bitstream generation unit 42 may determine for each pair, whether the pairs have the same value or nearly the same value. When all of the pairs have the same value, the bitstream generation unit 42 may set the isAllValueSymmetric syntax element to one. When all of the pairs do not have the same value, the bitstream generation unit 42 may set the isAllValueSymmetric syntax element to zero. When one or more but not all of the pairs have the same value, the bitstream generation unit 42 may set the isAnyValueSymmetric syntax element to one. When none of the pairs have the same value, the bitstream generation unit 42 may set the isAnyValueSymmetric syntax element to zero. For pairs with symmetric values, the bitstream generation unit 42 may only specify one value rather than two separate values for the pair of speakers, thereby reducing the number of bits used to represent the audio rendering information 2 (e.g., the matrix in this example) in the bitstream 21.

When there are no value symmetries amongst the pairs, the bitstream generation unit 42 may also determine for each pair, whether the speaker pairs have sign symmetry (meaning that one speaker has a negative value while the other speaker has a positive value). When all of the pairs have sign symmetry, the bitstream generation unit 42 may set the isAllSignSymmetric syntax element to one. When all of the pairs do not have sign symmetry, the bitstream generation unit 42 may set the isAllSignSymmetric syntax element to zero. When one or more but not all of the pairs have sign symmetry, the bitstream generation unit 42 may set the isAnySignSymmetric syntax element to one. When none of the pairs have sign symmetry, the bitstream generation unit 42 may set the isAnySignSymmetric syntax element to zero. For pairs with symmetric signs, the bitstream generation unit 42 may only specify one or no sign rather than two separate signs for the speaker pair, thereby reducing the number of bits used to represent the audio rendering information 2 (e.g., the matrix in this example) in the bitstream 21.

The bitstream generation unit 42 may specify the DecodeHoaMatrixData( ) container shown in Table setting forth the syntax of HoaRenderingMatrix( ) according to the syntax shown in the following Table:

TABLE

Syntax of DecodeHoaMatrixData

```
Syntax                                                              No. of bits  Mnemonic

DecodeHoaMatrixData ( )
{
    j = 0;
    for (i=0; i<outputCount; ++i) {
    isValueSymmetric[i] = 0;
    isSignSymmetric[i] = 0;
            if ((outputConfig[i].pairType == SP_PAIR_SYMMETRIC)
&& (outputConfig[i].symmetricPair != NULL)) {
                if (0==(outputConfig[i].isLFE &&
(0==hasLfeRendering))) {
                    isValueSymmetric[i] = valueSymmetricPairs[j];
                    isSignSymmetric[i] = signSymmetricPairs[j++];
                }
            }
    }
    for (i = 0; i < inputCount; ++i) {
        currentHoaOrder = ceil(sqrt(i+1)-1);
        for (j = outputCount-1; j >= 0; --j) {
            signMatrix[i * outputCount + j] = 1;
            hoaMatrix [i * outputCount + j] = 0.0;
            if ((vertBitmask[i] && hasVerticalCoef) || !vertBitmask[i])
{
                hasValue = 1;
                if (0 == isValueSymmetric[j]) {
                    if ((hasLfeRendering && outputConfig[j].isLFE)
||
    (!outputConfig[j].isLFE)) {
                        if (isHoaCoefSparse[i]){
                            hasValue                                1            Uimsbf
                        }
                        if (hasValue) {
                            hoaMatrix [i * outputCount + j] =
    DecodeHoaGainValue(currentHoaOrder);
                            if (0==isSignSymmetric[j]) {
        if (hoaMatrix [i * outputCount + j] != 0.0) {
            if (currentHoaOrder || !zerothOrderAlwaysPositive) {
                signMatrix[i * outputCount + j] = boolVal*2-1;      1            Uimsbf
            }
        }
    } else { // isSignSymmetric[i] == 1
            pairIdx = outputConfig[j].symmetricPair-
>originalPosition;
            signMatrix[i * outputCount + j] = symSigns[i] *
signMatrix[i * outputCount + pairIdx];
    }
                }
            }
        }
            else { // isAllValueSymmetric
             pairIdx = outputConfig[j].symmetricPair-
```

TABLE-continued

Syntax of DecodeHoaMatrixData

| Syntax | No. of bits | Mnemonic |
|---|---|---|

```
>originalPosition;
                    hoaMatrix [i*outputCount+j] =
                                        hoaMatrix [i*outputCount+pairIdx];
                    SignMatrix[i *outputCount+j] = symSigns[i] *
     signMatrix[i*outputCount+pairIdx];
                         }
                    }
               }
     }
     for (i = 0; i < inputCount; ++i) {
          for (j = 0; j < outputCount; ++j) {
               hoaMatrix[i *outputCount+j] *=
signMatrix[i*outputCount+j];
          }
     }
}
```

The hasValue syntax element in the foregoing Table setting forth the syntax of DecodeHoaMatrixData may represent a flag indicative of whether the matrix element is sparsely coded. The signMatrix syntax element may represent a matrix with the sign values of the HOA rendering matrix in, as one example, linearized vector-form. The hoaMatrix syntax element may represent the HOA rendering matrix values in, as one example, linearized vector-form. The bitstream generation unit 42 may specify the DecodeHoaGainValue( ) container shown in Table setting forth the syntax of DecodeHoaMatrixData in accordance with the syntax shown in the following Table:

TABLE

Syntax of DecodeHoaGainValue

| Syntax | No. of bits | Mnemonic |
|---|---|---|

```
DecodeHoaGainValue(order)
{
     nAlphabet = (maxGain[order] −
     minGain[order]) * 2 ^
precisionLevel + 2;
     gainValueIndex = ReadRange(nAlphabet);
     gainValue = maxGain[order] −
     gainValueIndex / 2 ^
precisonLevel;
     if (gainValue < minGain) {
          gainValue = 0.0;
     }else {
          gainValue = 10.0 ^ (gainValue / 20.0);
     }
     return gainValue;
}
```

The bitstream generation unit 42 may specify the readRange( ) container shown in Table setting forth the syntax of the DecodeHoaGainValue in accordance with the syntax specified in the following Table:

TABLE 7

Syntax of ReadRange

| Syntax | No. of bits | Mnemonic |
|---|---|---|
| ReadRange(alphabetSize) | | |
| { | | |
| nBits = floor(log2(alphabetSize)); | | |
| nUnused = 2 ^ (nBits + 1) − alphabetSize; | | |
| **range**; | **nBits** | **uimsbf** |
| if (range >= nUnused) { | | |
| **rangeExtra**; | **1** | **uimsbf** |
| range = range * 2 − nUnused + rangeExtra; | | |
| } | | |
| return range; | | |
| } | | |

Although not shown in the example of FIG. 3, the audio encoding device 20 may also include a bitstream output unit that switches the bitstream output from the audio encoding device 20 (e.g., between the directional-based bitstream 21 and the vector-based bitstream 21) based on whether a current frame is to be encoded using the directional-based synthesis or the vector-based synthesis. The bitstream output unit may perform the switch based on the syntax element output by the content analysis unit 26 indicating whether a directional-based synthesis was performed (as a result of detecting that the HOA coefficients 11 were generated from a synthetic audio object) or a vector-based synthesis was performed (as a result of detecting that the HOA coefficients were recorded). The bitstream output unit may specify the correct header syntax to indicate the switch or current encoding used for the current frame along with the respective one of the bitstreams 21.

Moreover, as noted above, the soundfield analysis unit 44 may identify $BG_{TOT}$ ambient HOA coefficients 47, which may change on a frame-by-frame basis (although at times $BG_{TOT}$ may remain constant or the same across two or more adjacent (in time) frames). The change in $BG_{TOT}$ may result in changes to the coefficients expressed in the reduced foreground V[k] vectors 55. The change in $BG_{TOT}$ may result in background HOA coefficients (which may also be referred to as "ambient HOA coefficients") that change on a frame-by-frame basis (although, again, at times $BG_{TOT}$ may remain constant or the same across two or more adjacent (in time) frames). The changes often result in a change of energy for the aspects of the sound field represented by the addition or removal of the additional ambient HOA coefficients and the corresponding removal of coefficients from or addition of coefficients to the reduced foreground V[k] vectors 55.

As a result, the soundfield analysis unit 44 may further determine when the ambient HOA coefficients change from frame to frame and generate a flag or other syntax element indicative of the change to the ambient HOA coefficient in terms of being used to represent the ambient components of the sound field (where the change may also be referred to as a "transition" of the ambient HOA coefficient or as a "transition" of the ambient HOA coefficient). In particular, the coefficient reduction unit 46 may generate the flag (which may be denoted as an AmbCoeffTransition flag or an AmbCoeffIdxTransition flag), providing the flag to the bitstream generation unit 42 so that the flag may be included in the bitstream 21 (possibly as part of side channel information).

The coefficient reduction unit 46 may, in addition to specifying the ambient coefficient transition flag, also modify how the reduced foreground V[k] vectors 55 are generated. In one example, upon determining that one of the ambient HOA ambient coefficients is in transition during the current frame, the coefficient reduction unit 46 may specify, a vector coefficient (which may also be referred to as a "vector element" or "element") for each of the V-vectors of the reduced foreground V[k] vectors 55 that corresponds to the ambient HOA coefficient in transition. Again, the ambient HOA coefficient in transition may add or remove from the $BG_{TOT}$ total number of background coefficients. Therefore, the resulting change in the total number of background coefficients affects whether the ambient HOA coefficient is included or not included in the bitstream, and whether the corresponding element of the V-vectors are included for the V-vectors specified in the bitstream in the second and third configuration modes described above. More information regarding how the coefficient reduction unit 46 may specify the reduced foreground V[k] vectors 55 to overcome the changes in energy is provided in U.S. application Ser. No. 14/594,533, entitled "TRANSITIONING OF AMBIENT HIGHER_ORDER AMBISONIC COEFFICIENTS," filed Jan. 12, 2015.

Figure 4:
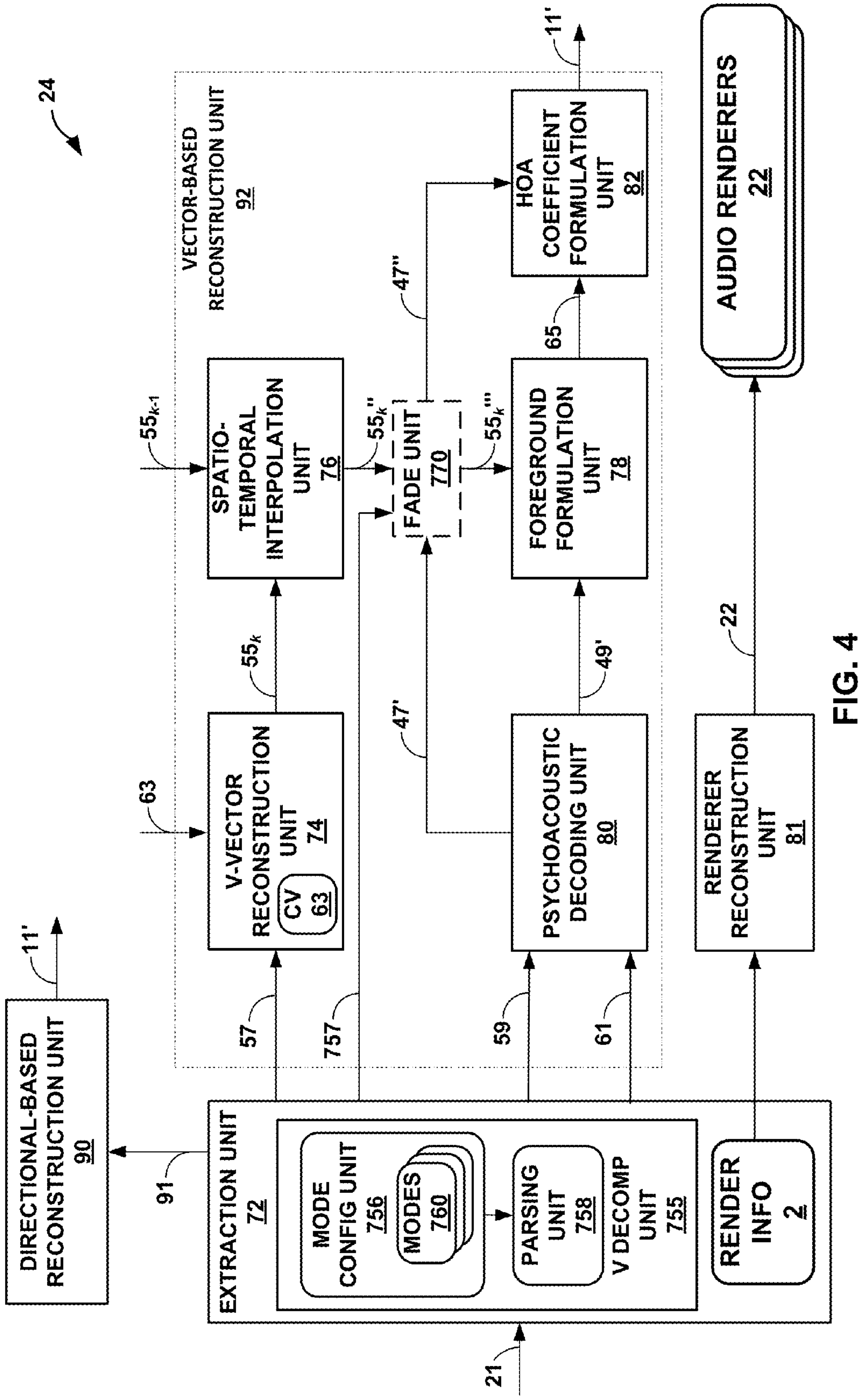
FIG. 4 is a block diagram illustrating the audio decoding device of FIG. 2 in more detail.

FIG. 4 is a block diagram illustrating the audio decoding device 24 of FIG. 2 in more detail. As shown in the example of FIG. 4 the audio decoding device 24 may include an extraction unit 72, a renderer reconstruction unit 81, a directionality-based reconstruction unit 90 and a vector-based reconstruction unit 92. Although described below, more information regarding the audio decoding device 24 and the various aspects of decompressing or otherwise decoding HOA coefficients is available in International Patent Application Publication No. WO 2014/194099, entitled "INTERPOLATION FOR DECOMPOSED REPRESENTATIONS OF A SOUND FIELD," filed 29 May 2014.

The extraction unit 72 may represent a unit configured to receive the bitstream 21 and extract audio rendering information 2 and the various encoded versions (e.g., a directional-based encoded version or a vector-based encoded version) of the HOA coefficients 11. In other words, Higher Order Ambisonics (HOA) rendering matrices may be transmitted by the audio encoding device 20 to enable control over the HOA rendering process at the audio playback system 16. Transmission may be facilitated by means of the mpegh3daConfigExtension of Type ID_CONFIG_EXT_HOA_MATRIX shown above. The mpegh3daConfigExtension may contain several HOA rendering matrices for different loudspeaker reproduction configurations. When HOA rendering matrices are transmitted, the audio encoding device 20 signals, for each HOA rendering matrix signal, the associated target loudspeaker layout that determines together with the HoaOrder the dimensions of the rendering matrix.

The transmission of a unique HoaRenderingMatrixId allows referencing to a default HOA rendering matrix available at the audio playback system 16, or to a transmitted HOA rendering matrix from outside of the audio bitstream 21. In some instances, every HOA rendering matrix is assumed to be normalized in N3D and follows the ordering of the HOA coefficients as defined in the bitstream 21.

The function findSymmetricSpeakers may, as noted above, indicate a number and a position of all loudspeaker pairs within the provided loudspeaker setup which are symmetric with respect to, as one example, the median plane of a listener at the so-called "sweet spot." This helper function may be defined as follows:

int findSymmetricSpeakers(int outputCount, SpeakerInformation* outputConfig, int hasLfeRendering);

The extraction unit 72 may invoke the function createSymSigns to compute a vector of 1.0 and −1.0 values which may then be used to generate the matrix elements associated with symmetric loudspeakers. This createSymSigns function may be defined as followed:

```
void createSymSigns(int* symSigns, int hoaOrder)
{
    int n, m, k = 0;
    for (n = 0; n<=hoaOrder; ++n) {
        for (m = −n; m<=n; ++m)
            symSigns[k++] = ((m>=0)*2)−1;
    }
}
```

The extraction unit 72 may invoke the function create2dBitmask to generate a bitmask to identify the HOA coefficients that are only used in the horizontal plane. The create2dBitmask function may be defined as follows:

```
void create2dBitmask(int* bitmask, int hoaOrder)
{
    int n, m, k = 0;
    bitmask[k++] = 0;
    for (n = 1; n<=hoaOrder; ++n) {
        for (m = −n; m<=n; ++m)
            bitmask[k++] = abs(m)!=n;
    }
}
```

To decode the HOA Rendering Matrix Coefficients, the extraction unit 72 may first extract the syntax element HoaRenderingMatrixSet( ) which as noted above may contain one or more HOA rendering matrices that may be applied to achieve a HOA rendering to a desired loudspeaker layout. In some instances, a given bit stream may not contain more than one instance of HoaRenderingMatrixSet( ). The syntax element HoaRenderingMatrix( ) contains the HOA rendering matrix information (which may be denoted as renderer info 2 in the example of FIG. 4). The extraction unit 72 may first read in the config information, which may guide the decoding process. Afterward, the extraction unit 72 reads the matrix elements accordingly.

Figure 9:
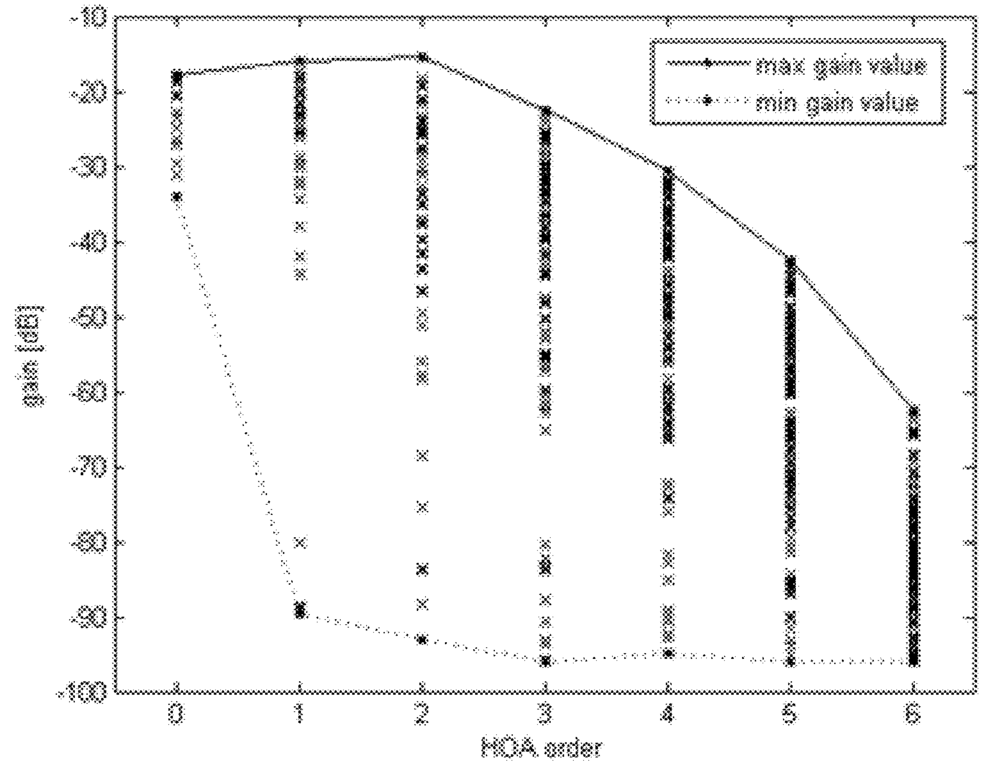
FIG. 9 is a diagram illustrating an example of higher-order ambisonic (HOA) order dependent min and max gains within an HOA rendering matrix.

In some instances, the extraction unit 72, at the beginning, reads the fields precisionLevel and gainLimitPerOrder. When the flag gainLimitPerOrder is set, the extraction unit 72 reads and decodes the maxGain, and minGain fields for each HOA order separately. When the flag gainLimitPerOrder is not set, the extraction unit 72 reads and decodes the fields maxGain and minGain once and applies these fields to all HOA orders during the decoding process. In some instances, the minGain value must be between 0 db and −69 dB. In some instances, the maxGain value must be between 1 dB and 111 dB lower than the minGain value. FIG. 9 is a diagram illustrating an example of HOA order dependent min and max gains within an HOA rendering matrix.

Figure 10:
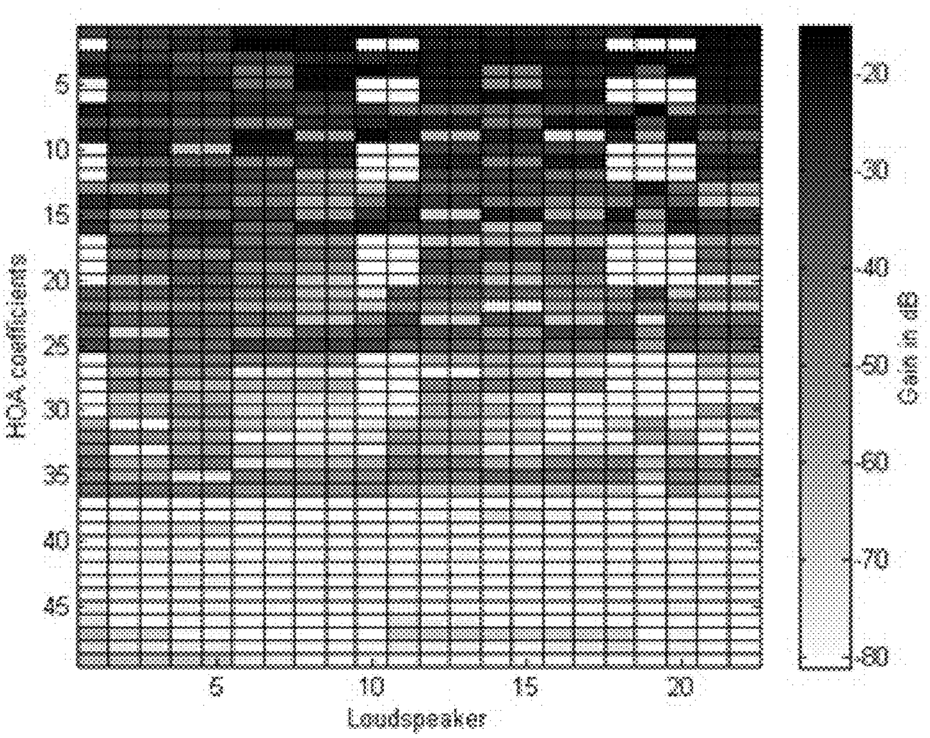
FIG. 10 is a diagram illustrating a partially sparse 6th order HOA rendering matrix for 22 loudspeakers.

The extraction unit 72 may next read the flag isFullMatrix, which may signal whether a matrix is defined as full or as partially sparse. When the matrix is defined as partially sparse, the extraction unit 72 reads the next field (e.g., the firstSparseOrder syntax element), which specifies the HOA order from which the HOA rendering matrix is sparsely coded. HOA rendering matrices may often be dense for low order and become sparse in the higher orders, depending on the loudspeaker reproduction setup. FIG. 10 is a diagram illustrating a partially sparse 6th order HOA rendering matrix for 22 loudspeakers. The sparseness of the matrix shown in FIG. 10 starts at the 26th HOA coefficient (HOA order 5).

Depending on whether one or more low frequency effects (LFE) channels exist within the loudspeaker reproduction setup (indicated by the lfeExists syntax element), the extraction unit 72 may read the field hasLfeRendering. When hasLfeRendering is not set, the extraction unit 72 is configured to assume the matrix elements related to the LFE channels are digital zeros. The next field read by the extraction unit 72 is the flag zerothOrderAlwaysPositive, which signals whether the matrix elements associated with the coefficient of the 0th order are positive. In this case that zerothOrderAlwaysPositive indicates that the zeroth order HOA coefficients are positive, the extraction unit 72 determines that number signs are not coded for the rendering matrix coefficients corresponding to the zeroth order HOA coefficients.

In the following, properties of the HOA rendering matrix may be signaled for loudspeaker pairs symmetric with regards to the median plane. In some instances, there are two symmetry properties relating to a) value symmetry and b) sign symmetry. In the case of value symmetry, the matrix elements of the left loudspeaker of the symmetric loudspeaker pair are not coded, but rather the extraction unit 72 derives those elements form the decoded matrix elements of the right loudspeaker by employing the helper function createSymSigns, which performs the following:

pairIdx=outputConfig[*j*].symmetricPair->originalPosition;

hoaMatrix[*i**outputCount+*j*]=hoaMatrix[*i**outputCount+pairIdx]; and signMatrix[*i**outputCount+*j*]=symSigns[*i*]*signMatrix[*i**outputCount+pairIdx].

Figure 11:
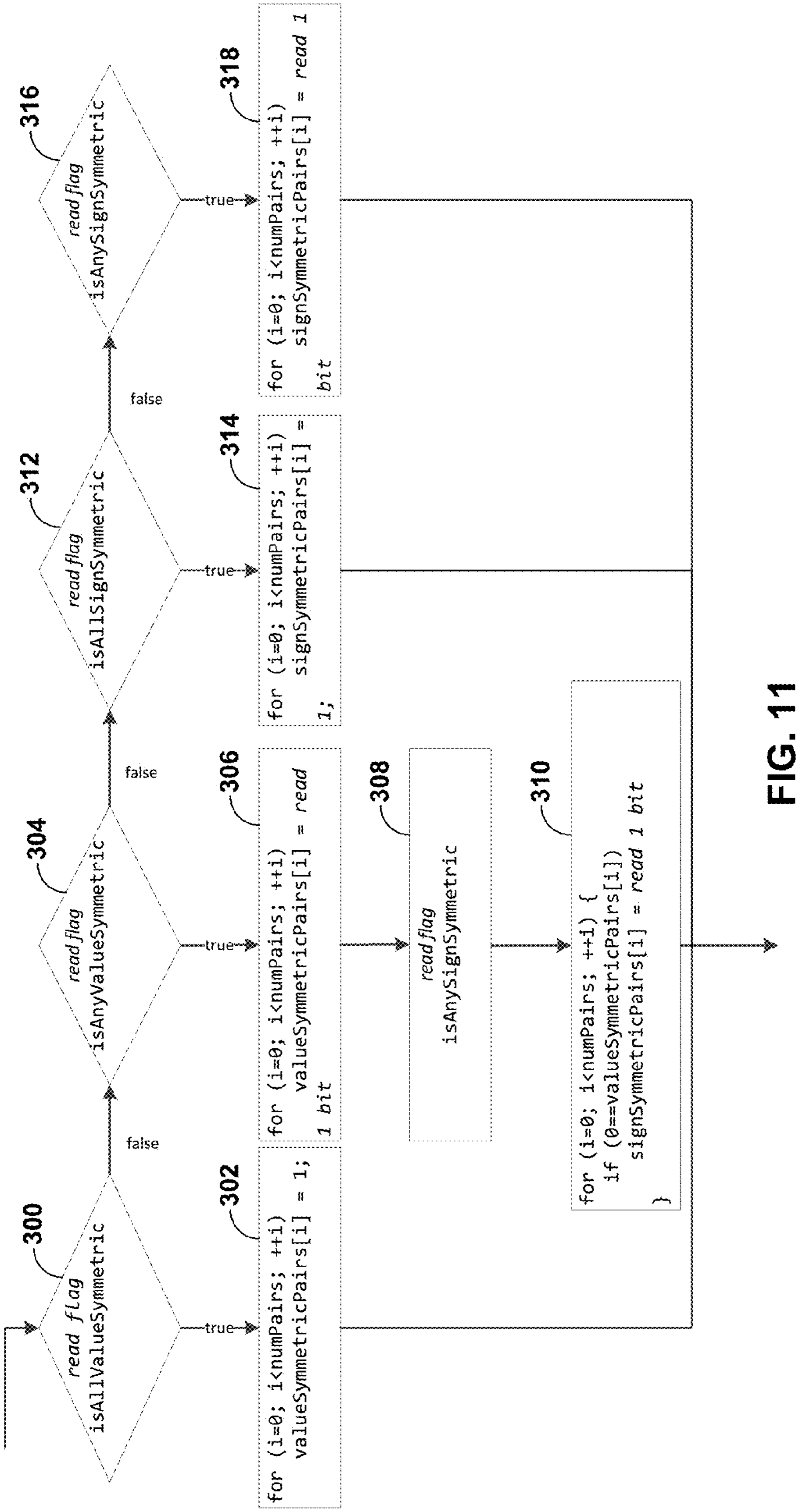
FIG. 11 is a flow diagram illustrating the signaling of symmetry properties.

When a loudspeaker pair is not value symmetric, then the matrix elements may be symmetric with regards to their number signs. When a loudspeaker pair is sign symmetric, the number signs of the matrix elements of the left loudspeaker of the symmetric loudspeaker pair are not coded, and the extraction unit 72 derives these number signs from the number signs of the matrix elements associated with the right loudspeaker by employing the helper function createSymSigns, which performs the following:

pairIdx=outputConfig[*j*].symmetricPair->originalPosition;

signMatrix[*i**outputCount+*j*]=symSigns[*i*]*signMatrix[*i**outputCount+pairIdx];

FIG. 11 is a diagram illustrating the signaling of the symmetry properties. A loudspeaker pair cannot be defined as value symmetric and sign symmetric at the same time. The final decoding flag hasVerticalCoef specified if only the matrix elements associated with circular (i.e., 2D) HOA coefficients are coded. If hasVerticalCoef is not set, the matrix elements associated with the HOA coefficients defined with the helper function create2dBitmask are set to digital zero.

That is, the extraction unit 72 may extract audio rendering information 2 in accordance with the process set forth in FIG. 11. The extraction unit 72 may first read the isAllValueSymmetric syntax element from the bitstream 21 (300). When the isAllValueSymmetric syntax element is set to one (or, in other words, a Boolean true), the extraction unit 72 may iterate through the value of the numPairs syntax element, setting the valueSymmetricPairs array syntax element to a value of one (effectively indicating that all of the speaker pairs are value symmetric) (302).

When the isAllValueSymmetric syntax element is set to zero (or, in other words, a Boolean false), the extraction unit 72 may next read the isAnyValueSymmetric syntax element (304). When the isAnyValueSymmetric syntax element is set to one (or, in other words, a Boolean true), the extraction unit 72 may iterate through the value of the numPairs syntax element, setting the valueSymmetricPairs array syntax element to a bit read sequentially from the bitstream 21 (306). The extraction unit 72 may also obtain the isAnySignSymmetric syntax element for any of the pairs having a valueSymmetricPairs syntax element set to zero (308). The extraction unit 72 may then iterate through the number of pairs again and, when the valueSymmetricPairs is equal to zero, set a signSymmetricPairs bit to a value read from the bitstream 21 (310).

When the isAnyValueSymmetric syntax element is set to zero (or, in other words, a Boolean false), the extraction unit 72 may read the isAllSignSymmetric syntax element from the bitstream 21 (312). When the isAllSignSymmetric syntax element is set to a value of one (or, in other words, a Boolean true), the extraction unit 72 may iterate through the value of the numPairs syntax element, setting the signSymmetricPairs array syntax element to a value of one (effectively indicating that all of the speaker pairs are sign symmetric) (316).

When the isAllSignSymmetric syntax element is set to zero (or, in other words, a Boolean false), the extraction unit 72 may read the isAnySignSymmetric syntax element from the bitstream 21 (316). The extraction unit 72 may iterate through the value of the numPairs syntax element, setting the signSymmetricPairs array syntax element to a bit read sequentially from the bitstream 21 (318). The bitstream generation unit 42 may perform a reciprocal process to that described above with respect to the extraction unit 72 to specify the value symmetry information, the sign symmetry information or a combination of both the value and sign symmetry information.

The renderer reconstruction unit 81 may represent a unit configure d to reconstruct a renderer based on the audio rendering information 2. That is, using the above mentioned properties, the renderer reconstruction unit 81 may read a series of matrix element gain values. To read the absolute gain value, the renderer reconstruction unit 81 may invoke the function DecodeGainValue( ). The renderer reconstruction unit 81 may invoke the function ReadRange( ) of the alphabet index to uniformly decode the gain values. When the decoded gain value is not a digital zero, the renderer reconstruction unit 81 may read the number sign value in addition (per Table a below). When the matrix element is associated with an HOA coefficient that was signaled to be sparse (via isHoaCoefSparse) the hasValue flag precedes the gainValueIndex (see Table b). When the hasValue flag is zero, this element is set to digital zero and no gainValueIndex and sign are signaled.

TABLES A AND B

Examples for bit stream syntax to decode a matrix element a)

| bitfield | gainValueIndex | sign |
|---|---|---|
| size | alphabetSize | 1 |

b)

| bitfield | hasValue | gainValueIndex | sign |
|---|---|---|---|
| size | 1 | alphabetSize | 1 |

Depending on the specified symmetry properties for loudspeaker pairs, the renderer reconstruction unit 81 may derive the matrix elements associated with the left loudspeaker from the right loudspeaker. In this case, the audio rendering information 2 in the bitstream 21 to decode a matrix element for the left loudspeaker is reduced or potentially completely omitted accordingly.

In this way, the audio decoding device 24 may determine symmetry information to reduce a size of the audio rendering information to be specified. In some instances, the audio decoding device 24 may determine symmetry information to reduce a size of the audio rendering information to be specified, and derive at least a portion of the audio renderer based on the symmetry information.

In these and other instances, the audio decoding device 24 may determine value symmetry information to reduce a size of the audio rendering information to be specified. In these and other instances, the audio decoding device 24 may derive at least a portion of the audio renderer based on the value symmetry information.

In these and other instances, the audio decoding device 24 may determine sign symmetry information to reduce a size of the audio rendering information to be specified. In these and other instances, the audio decoding device 24 may derive at least a portion of the audio renderer based on the sign symmetry information.

In these and other instances, the audio decoding device 24 may determine sparseness information indicative of a sparseness of a matrix used to render spherical harmonic coefficients to a plurality of speaker feeds.

In these and other instances, the audio decoding device 24 may determine a speaker layout for which a matrix is to be used to render spherical harmonic coefficients to a plurality of speaker feeds.

The audio decoding device 24 may, in this respect, then determine audio rendering information 2 specified in the bitstream. Based on the signal value included in the audio rendering information 2, the audio playback system 16 may render a plurality of speaker feeds 25 using one of the audio renderers 22. The speaker feeds may drive speakers 3. As noted above, the signal value may in some instances include a matrix (which is decoded and provided as one of audio renderers 22) used to render spherical harmonic coefficients to a plurality of speaker feeds. In this case, the audio playback system 16 may configure one of the audio renderers 22 with the matrix, using this one of the audio renderers 22 to render the speaker feeds 25 based on the matrix.

To extract and then decode the various encoded versions of the HOA coefficients 11 so that the HOA coefficients 11 are available to be rendered using the obtained audio renderer 22, the extraction unit 72 may determine from the above noted syntax element indicative of whether the HOA coefficients 11 were encoded via the various direction-based or vector-based versions. When a directional-based encoding was performed, the extraction unit 72 may extract the directional-based version of the HOA coefficients 11 and the syntax elements associated with the encoded version (which is denoted as directional-based information 91 in the example of FIG. 4), passing the directional based information 91 to the directional-based reconstruction unit 90. The directional-based reconstruction unit 90 may represent a unit configured to reconstruct the HOA coefficients in the form of HOA coefficients 11' based on the directional-based information 91.

When the syntax element indicates that the HOA coefficients 11 were encoded using a vector-based decomposition, the extraction unit 72 may extract the coded foreground V[k] vectors 57 (which may include coded weights 57 and/or indices 63 or scalar quantized V-vectors), the encoded ambient HOA coefficients 59 and the corresponding audio objects 61 (which may also be referred to as the encoded nFG signals 61). The audio objects 61 each correspond to one of the vectors 57. The extraction unit 72 may pass the coded foreground V[k] vectors 57 to the V-vector reconstruction unit 74 and the encoded ambient HOA coefficients 59 along with the encoded nFG signals 61 to the psychoacoustic decoding unit 80.

The V-vector reconstruction unit 74 may represent a unit configured to reconstruct the V-vectors from the encoded foreground V[k] vectors 57. The V-vector reconstruction unit 74 may operate in a manner reciprocal to that of the quantization unit 52.

The psychoacoustic decoding unit 80 may operate in a manner reciprocal to the psychoacoustic audio coder unit 40 shown in the example of FIG. 3 so as to decode the encoded ambient HOA coefficients 59 and the encoded nFG signals 61 and thereby generate energy compensated ambient HOA coefficients 47' and the interpolated nFG signals 49' (which may also be referred to as interpolated nFG audio objects 49'). The psychoacoustic decoding unit 80 may pass the energy compensated ambient HOA coefficients 47' to the fade unit 770 and the nFG signals 49' to the foreground formulation unit 78.

The spatio-temporal interpolation unit 76 may operate in a manner similar to that described above with respect to the spatio-temporal interpolation unit 50. The spatio-temporal interpolation unit 76 may receive the reduced foreground V[k] vectors $\mathbf{55}_k$ and perform the spatio-temporal interpolation with respect to the foreground V[k] vectors $\mathbf{55}_k$ and the reduced foreground V[k−1] vectors $\mathbf{55}_{k-1}$ to generate interpolated foreground V[k] vectors $\mathbf{55}_k''$. The spatio-temporal interpolation unit 76 may forward the interpolated foreground V[k] vectors $\mathbf{55}_k''$ to the fade unit 770.

The extraction unit 72 may also output a signal 757 indicative of when one of the ambient HOA coefficients is in transition to fade unit 770, which may then determine which of the $SHC_{BG}$ 47' (where the $SHC_{BG}$ 47' may also be denoted as “ambient HOA channels 47'” or “ambient HOA coefficients 47'”) and the elements of the interpolated foreground V[k] vectors $\mathbf{55}_k''$ are to be either faded-in or faded-out. In some examples, the fade unit 770 may operate opposite with respect to each of the ambient HOA coefficients 47' and the elements of the interpolated foreground V[k] vectors $\mathbf{55}_k''$. That is, the fade unit 770 may perform a fade-in or fade-out, or both a fade-in or fade-out with respect to corresponding one of the ambient HOA coefficients 47', while performing a fade-in or fade-out or both a fade-in and a fade-out, with respect to the corresponding one of the elements of the interpolated foreground V[k] vectors $\mathbf{55}_k$''. The fade unit 770 may output adjusted ambient HOA coefficients 47'' to the HOA coefficient formulation unit 82 and adjusted foreground V[k] vectors $\mathbf{55}_k$''' to the foreground formulation unit 78. In this respect, the fade unit 770 represents a unit configured to perform a fade operation with respect to various aspects of the HOA coefficients or derivatives thereof, e.g., in the form of the ambient HOA coefficients 47' and the elements of the interpolated foreground V[k] vectors $\mathbf{55}_k$''.

The foreground formulation unit 78 may represent a unit configured to perform matrix multiplication with respect to the adjusted foreground V[k] vectors $\mathbf{55}_k$''' and the interpolated nFG signals 49' to generate the foreground HOA coefficients 65. In this respect, the foreground formulation unit 78 may combine the audio objects 49' (which is another way by which to denote the interpolated nFG signals 49') with the vectors $\mathbf{55}_k$''' to reconstruct the foreground or, in other words, predominant aspects of the HOA coefficients 11'. The foreground formulation unit 78 may perform a matrix multiplication of the interpolated nFG signals 49' by the adjusted foreground V[k] vectors $\mathbf{55}_k$'''.

The HOA coefficient formulation unit 82 may represent a unit configured to combine the foreground HOA coefficients 65 to the adjusted ambient HOA coefficients 47'' so as to obtain the HOA coefficients 11'. The prime notation reflects that the HOA coefficients 11' may be similar to but not the same as the HOA coefficients 11. The differences between the HOA coefficients 11 and 11' may result from loss due to transmission over a lossy transmission medium, quantization or other lossy operations.

Additionally, the extraction unit 72 and the audio decoding device 24 more generally may also be configured to operate in accordance with various aspects of the techniques described in this disclosure to obtain the bitstreams 21 that are potentially optimized in the ways described above with respect to not including various syntax elements or data fields in certain instances.

In some instances, the audio decoding device 24 may be configured to, when decompressing higher order ambisonic audio data compressed using a first compression scheme, obtain a bitstream 21 representative of a compressed version of the higher order ambisonic audio data that does not include bits corresponding to a second compression scheme also used to compress the higher order ambisonic audio data. The first compression scheme may comprise a vector-based compression scheme, the resulting vector defined in the spherical harmonic domain and sent via the bitstream 21. The vector based decomposition compression scheme may, in some examples, comprise a compression scheme that involves application of a singular value decomposition (or equivalents thereof as described in more detail with respect to the example of FIG. 3) to the higher order ambisonic audio data.

The audio decoding device 24 may be configured to obtain the bitstream 21 that does not include the bits correspond to at least one syntax element used for performing the second type of compression scheme. As noted above, the second compression scheme comprises a directionality-based compression scheme. More specifically, the audio decoding device 24 may be configured to obtain the bitstream 21 that does not include the bits corresponding to an HOAPredictionInfo syntax elements of the second compression scheme. In other words, when the second compression scheme comprises a directionality-based compression scheme, the audio decoding device 24 may be configured to obtain the bitstream 21 that does not include the bits corresponding to an HOAPredictionInfo syntax element of the directionality-based compression scheme. As noted above, the HOAPredictionInfo syntax element may be indicative of a prediction between two or more directional-based signals.

In some instances, either as an alternative or in conjunction with the foregoing examples, the audio decoding device 24 may be configured to, when gain correction is suppressed during compression of higher order ambisonic audio data, obtaining the bitstream 21 representative of a compressed version of the higher order ambisonic audio data that does not include gain correction data. The audio decoding device 24 may, in these instances, be configured to decompress the higher order ambisonic audio data in accordance with a vector-based synthesis decompression scheme. The compressed version of the higher order ambisonic data is generated through application of a singular value decomposition (or equivalents thereof described in more detail with respect to the example of FIG. 3 above) to the higher order ambisonic audio data. When SVD is applied or equivalents thereof to the HOA audio data, the audio encoding device 20 specifies at least one of the resulting vectors or bits indicative thereof in the bitstream 21, where the vectors describe spatial characteristics of corresponding foreground audio objects (such as a width, location and volume of the corresponding foreground audio objects).

More specifically, the audio decoding device 24 may be configured to obtain a MaxGainCorrAmbExp syntax element from the bitstream 21 with a value set to zero to indicate that the gain correction is suppressed. That is, the audio decoding device 24 may be configured to obtain, when the gain correction is suppressed, the bitstream such that the bitstream does not include a HOAGainCorrection data field that stores the gain correction data. The bitstream 21 may comprise a MaxGainCorrAmbExp syntax element having a value of zero to indicate that the gain correction is suppressed and does not include a HOAGainCorrection data field that stores the gain correction data. Suppression of the gain correction may occur when the compression of the higher order ambisonic audio data includes application of a unified speech and audio and speech coding (USAC) to the higher order ambisonic audio data.

Figure 5:
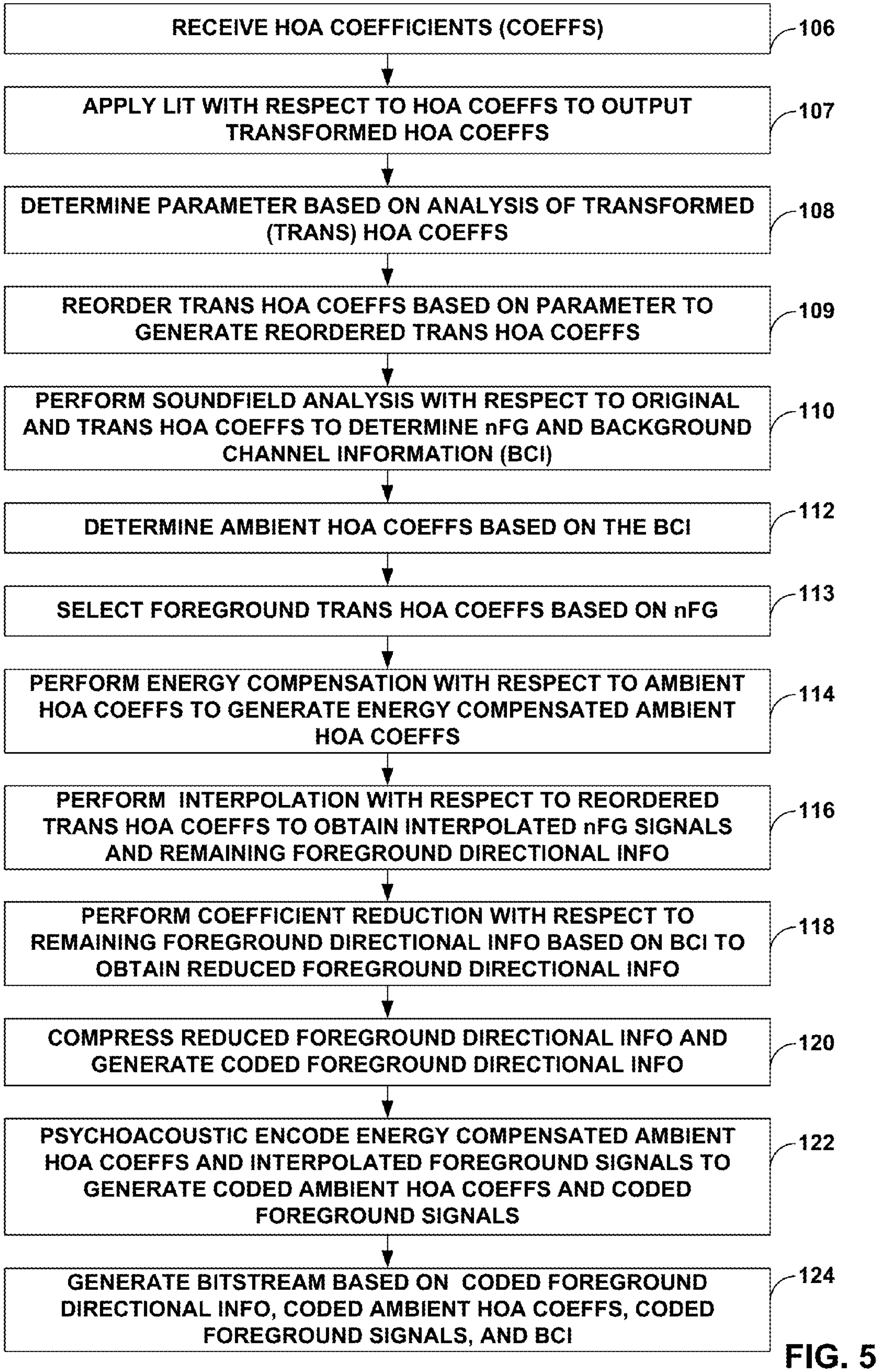
FIG. 5 is a flowchart illustrating exemplary operation of an audio encoding device in performing various aspects of the vector-based synthesis techniques described in this disclosure.

FIG. 5 is a flowchart illustrating exemplary operation of an audio encoding device, such as the audio encoding device 20 shown in the example of FIG. 3, in performing various aspects of the vector-based synthesis techniques described in this disclosure. Initially, the audio encoding device 20 receives the HOA coefficients 11 (106). The audio encoding device 20 may invoke the LIT unit 30, which may apply a LIT with respect to the HOA coefficients to output transformed HOA coefficients (e.g., in the case of SVD, the transformed HOA coefficients may comprise the US[k] vectors 33 and the V[k] vectors 35) (107).

The audio encoding device 20 may next invoke the parameter calculation unit 32 to perform the above described analysis with respect to any combination of the US[k] vectors 33, US[k−1] vectors 33, the V[k] and/or V[k−1] vectors 35 to identify various parameters in the manner described above. That is, the parameter calculation unit 32 may determine at least one parameter based on an analysis of the transformed HOA coefficients 33/35 (108).

The audio encoding device 20 may then invoke the reorder unit 34, which may reorder the transformed HOA coefficients (which, again in the context of SVD, may refer to the US[k] vectors 33 and the V[k] vectors 35) based on the parameter to generate reordered transformed HOA coefficients 33'/35' (or, in other words, the US[k] vectors 33' and the V[k] vectors 35'), as described above (109). The audio encoding device 20 may, during any of the foregoing operations or subsequent operations, also invoke the soundfield analysis unit 44. The soundfield analysis unit 44 may, as described above, perform a soundfield analysis with respect to the HOA coefficients 11 and/or the transformed HOA coefficients 33/35 to determine the total number of foreground channels (nFG) 45, the order of the background soundfield ($N_{BG}$) and the number (nBGa) and indices (i) of additional BG HOA channels to send (which may collectively be denoted as background channel information 43 in the example of FIG. 3) (109).

The audio encoding device 20 may also invoke the background selection unit 48. The background selection unit 48 may determine background or ambient HOA coefficients 47 based on the background channel information 43 (110). The audio encoding device 20 may further invoke the foreground selection unit 36, which may select the reordered US[k] vectors 33' and the reordered V[k] vectors 35' that represent foreground or distinct components of the soundfield based on nFG 45 (which may represent a one or more indices identifying the foreground vectors) (112).

The audio encoding device 20 may invoke the energy compensation unit 38. The energy compensation unit 38 may perform energy compensation with respect to the ambient HOA coefficients 47 to compensate for energy loss due to removal of various ones of the HOA coefficients by the background selection unit 48 (114) and thereby generate energy compensated ambient HOA coefficients 47'.

The audio encoding device 20 may also invoke the spatio-temporal interpolation unit 50. The spatio-temporal interpolation unit 50 may perform spatio-temporal interpolation with respect to the reordered transformed HOA coefficients 33'/35' to obtain the interpolated foreground signals 49' (which may also be referred to as the "interpolated nFG signals 49'") and the remaining foreground directional information 53 (which may also be referred to as the "V[k] vectors 53") (116). The audio encoding device 20 may then invoke the coefficient reduction unit 46. The coefficient reduction unit 46 may perform coefficient reduction with respect to the remaining foreground V[k] vectors 53 based on the background channel information 43 to obtain reduced foreground directional information 55 (which may also be referred to as the reduced foreground V[k] vectors 55) (118).

The audio encoding device 20 may then invoke the quantization unit 52 to compress, in the manner described above, the reduced foreground V[k] vectors 55 and generate coded foreground V[k] vectors 57 (120).

The audio encoding device 20 may also invoke the psychoacoustic audio coder unit 40. The psychoacoustic audio coder unit 40 may psychoacoustic code each vector of the energy compensated ambient HOA coefficients 47' and the interpolated nFG signals 49' to generate encoded ambient HOA coefficients 59 and encoded nFG signals 61. The audio encoding device may then invoke the bitstream generation unit 42. The bitstream generation unit 42 may generate the bitstream 21 based on the coded foreground directional information 57, the coded ambient HOA coefficients 59, the coded nFG signals 61 and the background channel information 43.

Figure 6:
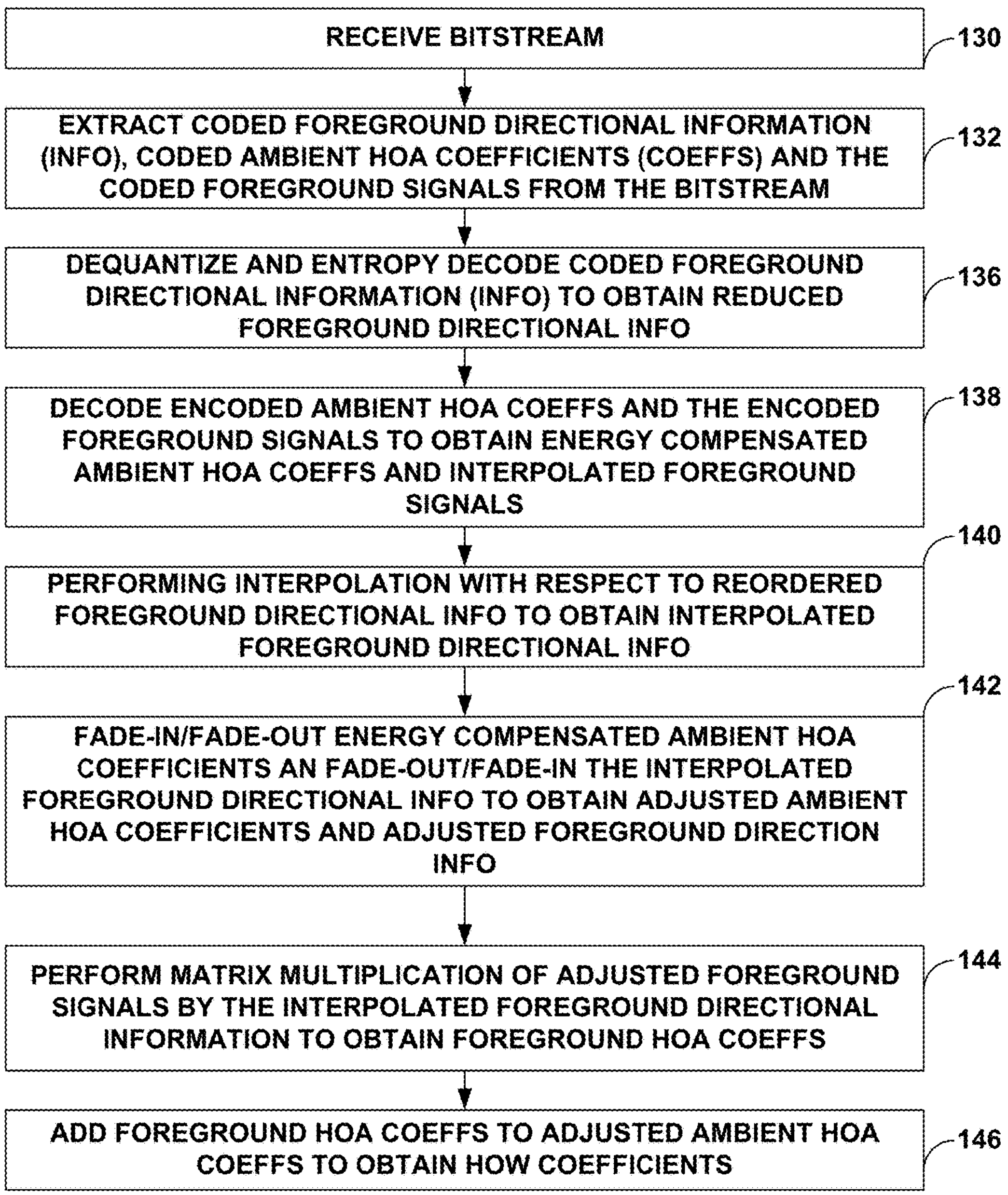
FIG. 6 is a flowchart illustrating exemplary operation of an audio decoding device in performing various aspects of the techniques described in this disclosure.

FIG. 6 is a flowchart illustrating exemplary operation of an audio decoding device, such as the audio decoding device 24 shown in FIG. 4, in performing various aspects of the techniques described in this disclosure. Initially, the audio decoding device 24 may receive the bitstream 21 (130). Upon receiving the bitstream, the audio decoding device 24 may invoke the extraction unit 72. Assuming for purposes of discussion that the bitstream 21 indicates that vector-based reconstruction is to be performed, the extraction unit 72 may parse the bitstream to retrieve the above noted information, passing the information to the vector-based reconstruction unit 92.

In other words, the extraction unit 72 may extract the coded foreground directional information 57 (which, again, may also be referred to as the coded foreground V[k] vectors 57), the coded ambient HOA coefficients 59 and the coded foreground signals (which may also be referred to as the coded foreground nFG signals 59 or the coded foreground audio objects 59) from the bitstream 21 in the manner described above (132).

The audio decoding device 24 may further invoke the dequantization unit 74. The dequantization unit 74 may entropy decode and dequantize the coded foreground directional information 57 to obtain reduced foreground directional information $\mathbf{55}_k$ (136). The audio decoding device 24 may also invoke the psychoacoustic decoding unit 80. The psychoacoustic audio decoding unit 80 may decode the encoded ambient HOA coefficients 59 and the encoded foreground signals 61 to obtain energy compensated ambient HOA coefficients 47' and the interpolated foreground signals 49' (138). The psychoacoustic decoding unit 80 may pass the energy compensated ambient HOA coefficients 47' to the fade unit 770 and the nFG signals 49' to the foreground formulation unit 78.

The audio decoding device 24 may next invoke the spatio-temporal interpolation unit 76. The spatio-temporal interpolation unit 76 may receive the reordered foreground directional information $\mathbf{55}_k'$ and perform the spatio-temporal interpolation with respect to the reduced foreground directional information $\mathbf{55}_k/\mathbf{55}_{k-1}$ to generate the interpolated foreground directional information $\mathbf{55}_k''$ (140). The spatio-temporal interpolation unit 76 may forward the interpolated foreground V[k] vectors $\mathbf{55}_k''$ to the fade unit 770.

The audio decoding device 24 may invoke the fade unit 770. The fade unit 770 may receive or otherwise obtain syntax elements (e.g., from the extraction unit 72) indicative of when the energy compensated ambient HOA coefficients 47' are in transition (e.g., the AmbCoeffTransition syntax element). The fade unit 770 may, based on the transition syntax elements and the maintained transition state information, fade-in or fade-out the energy compensated ambient HOA coefficients 47' outputting adjusted ambient HOA coefficients 47'' to the HOA coefficient formulation unit 82. The fade unit 770 may also, based on the syntax elements and the maintained transition state information, and fade-out or fade-in the corresponding one or more elements of the interpolated foreground V[k] vectors $\mathbf{55}_k''$ outputting the adjusted foreground V[k] vectors $\mathbf{55}_k'''$ to the foreground formulation unit 78 (142).

The audio decoding device 24 may invoke the foreground formulation unit 78. The foreground formulation unit 78 may perform matrix multiplication the nFG signals 49' by the adjusted foreground directional information $\mathbf{55}_k'''$ to obtain the foreground HOA coefficients 65 (144). The audio decoding device 24 may also invoke the HOA coefficient formulation unit 82. The HOA coefficient formulation unit 82 may add the foreground HOA coefficients 65 to adjusted ambient HOA coefficients 47'' so as to obtain the HOA coefficients 11' (146).

Figure 7:
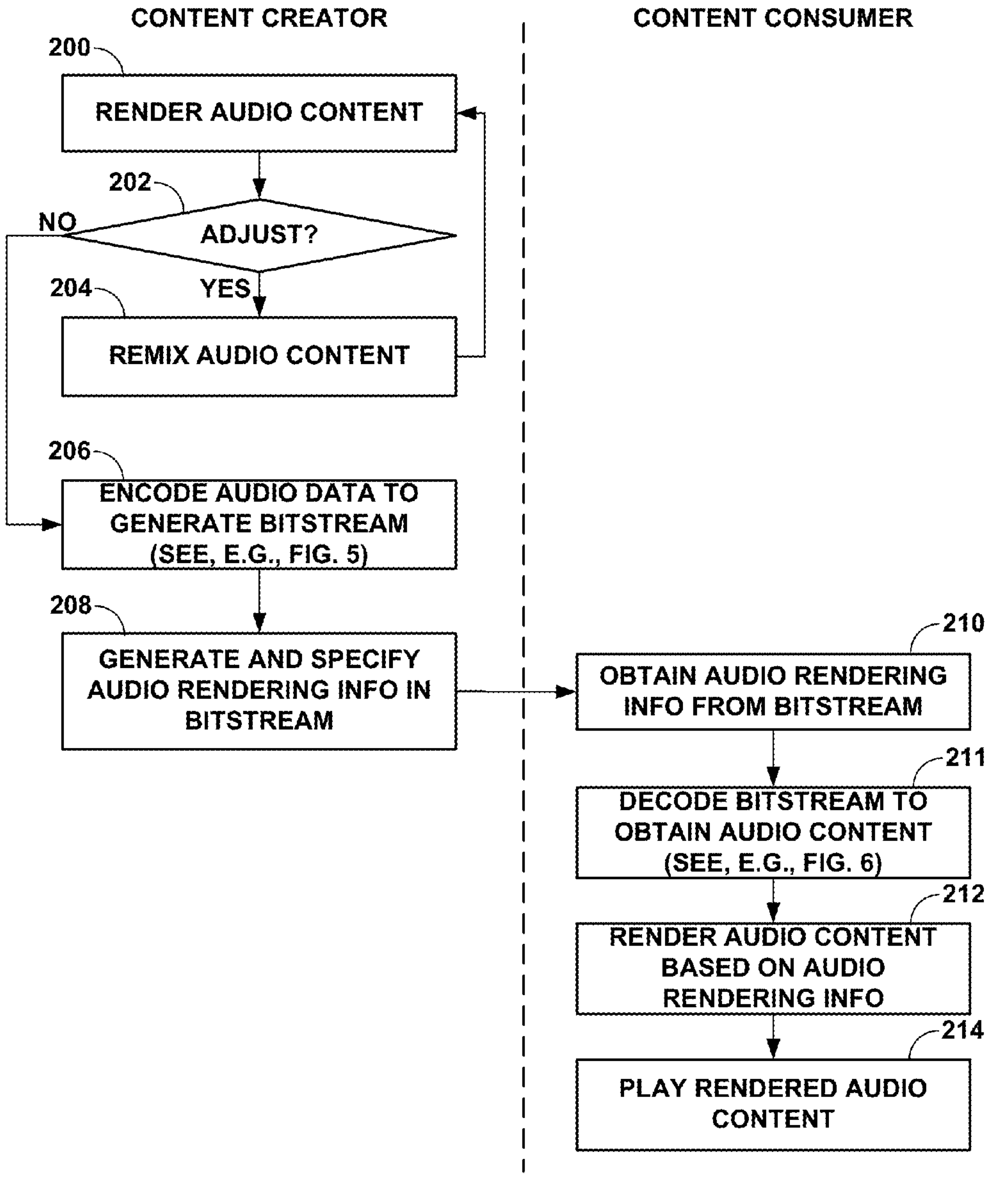
FIG. 7 is a flowchart illustrating example operation of a system, such as one of the system shown in the example of FIG. 2, in performing various aspects of the techniques described in this disclosure.

FIG. 7 is a flowchart illustrating example operation of a system, such as system 10 shown in the example of FIG. 2, in performing various aspects of the techniques described in this disclosure. As discussed above, the content creator device 12 may employ audio editing system 18 to create or edit captured or generated audio content (which is shown as the HOA coefficients 11 in the example of FIG. 2). The content creator device 12 may then render the HOA coefficients 11 using the audio renderer 1 to generated multi-channel speaker feeds, as discussed in more detail above (200). The content creator device 12 may then play these speaker feeds using an audio playback system and determine whether further adjustments or editing is required to capture, as one example, the desired artistic intent (202). When further adjustments are desired ("YES" 202), the content creator device 12 may remix the HOA coefficients 11 (204), render the HOA coefficients 11 (200), and determine whether further adjustments are necessary (202). When further adjustments are not desired ("NO" 202), the audio encoding device 20 may encode the audio content to generate the bitstream 21 in the manner described above with respect to the example of FIG. 5 (206). The audio encoding device 20 may also generate and specify the audio rendering information 2 in the bitstream 21, as described in more detail above (208).

The content consumer device 14 may then obtain the audio rendering information 2 from the bitstream 21 (210). The decoding device 24 may then decode the bitstream 21 to obtain the audio content (which is shown as the HOA coefficients 11' in the example of FIG. 2) in the manner described above with respect to the example of FIG. 6 (211). The audio playback system 16 may then render the HOA coefficients 11' based on the audio rendering information 2 in the manner described above (212) and play the rendered audio content via loudspeakers 3 (214).

The techniques described in this disclosure may therefore enable, as a first example, a device that generates a bitstream representative of multi-channel audio content to specify audio rendering information. The device may, in this first example, include means for specifying audio rendering information that includes a signal value identifying an audio renderer used when generating the multi-channel audio content.

The device of first example, wherein the signal value includes a matrix used to render spherical harmonic coefficients to a plurality of speaker feeds.

In a second example, the device of first example, wherein the signal value includes two or more bits that define an index that indicates that the bitstream includes a matrix used to render spherical harmonic coefficients to a plurality of speaker feeds.

The device of second example, wherein the audio rendering information further includes two or more bits that define a number of rows of the matrix included in the bitstream and two or more bits that define a number of columns of the matrix included in the bitstream.

The device of first example, wherein the signal value specifies a rendering algorithm used to render audio objects to a plurality of speaker feeds.

The device of first example, wherein the signal value specifies a rendering algorithm used to render spherical harmonic coefficients to a plurality of speaker feeds.

The device of first example, wherein the signal value includes two or more bits that define an index associated with one of a plurality of matrices used to render spherical harmonic coefficients to a plurality of speaker feeds.

The device of first example, wherein the signal value includes two or more bits that define an index associated with one of a plurality of rendering algorithms used to render audio objects to a plurality of speaker feeds.

The device of first example, wherein the signal value includes two or more bits that define an index associated with one of a plurality of rendering algorithms used to render spherical harmonic coefficients to a plurality of speaker feeds.

The device of first example, wherein the means for specifying the audio rendering information comprises means for specify the audio rendering information on a per audio frame basis in the bitstream.

The device of first example, wherein the means for specifying the audio rendering information comprise means for specifying the audio rendering information a single time in the bitstream.

In a third example, a non-transitory computer-readable storage medium having stored thereon instructions that, when executed, cause one or more processors to specify audio rendering information in the bitstream, wherein the audio rendering information identifies an audio renderer used when generating the multi-channel audio content.

In a fourth example, a device for rendering multi-channel audio content from a bitstream, the device comprising means for determining audio rendering information that includes a signal value identifying an audio renderer used when generating the multi-channel audio content, and means for rendering a plurality of speaker feeds based on the audio rendering information specified in the bitstream.

The device of the fourth example, wherein the signal value includes a matrix used to render spherical harmonic coefficients to a plurality of speaker feeds, and wherein the means for rendering the plurality of speaker feeds comprises means for rendering the plurality of speaker feeds based on the matrix.

In a fifth example, the device of the fourth example, wherein the signal value includes two or more bits that define an index that indicates that the bitstream includes a matrix used to render spherical harmonic coefficients to a plurality of speaker feeds, wherein the device further comprising means for parsing the matrix from the bitstream in response to the index, and wherein the means for rendering the plurality of speaker feeds comprises means for rendering the plurality of speaker feeds based on the parsed matrix.

The device of the fifth example, wherein the signal value further includes two or more bits that define a number of rows of the matrix included in the bitstream and two or more bits that define a number of columns of the matrix included in the bitstream, and wherein the means for parsing the matrix from the bitstream comprises means for parsing the matrix from the bitstream in response to the index and based on the two or more bits that define a number of rows and the two or more bits that define the number of columns.

The device of the fourth example, wherein the signal value specifies a rendering algorithm used to render audio objects to the plurality of speaker feeds, and wherein the means for rendering the plurality of speaker feeds comprises means for rendering the plurality of speaker feeds from the audio objects using the specified rendering algorithm.

The device of the fourth example, wherein the signal value specifies a rendering algorithm used to render spherical harmonic coefficients to the plurality of speaker feeds, and wherein the means for rendering the plurality of speaker feeds comprises means for rendering the plurality of speaker feeds from the spherical harmonic coefficients using the specified rendering algorithm.

The device of the fourth example, wherein the signal value includes two or more bits that define an index associated with one of a plurality of matrices used to render spherical harmonic coefficients to the plurality of speaker feeds, and wherein the means for rendering the plurality of speaker feeds comprises means for rendering the plurality of speaker feeds from the spherical harmonic coefficients using the one of the plurality of matrixes associated with the index.

The device of the fourth example, wherein the signal value includes two or more bits that define an index associated with one of a plurality of rendering algorithms used to render audio objects to the plurality of speaker feeds, and wherein the means for rendering the plurality of speaker feeds comprises means for rendering the plurality of speaker feeds from the audio objects using the one of the plurality of rendering algorithms associated with the index.

The device of the fourth example, wherein the signal value includes two or more bits that define an index associated with one of a plurality of rendering algorithms used to render spherical harmonic coefficients to a plurality of speaker feeds, and wherein the means for rendering the plurality of speaker feeds comprises means for rendering the plurality of speaker feeds from the spherical harmonic coefficients using the one of the plurality of rendering algorithms associated with the index.

The device of the fourth example, wherein the means for determining the audio rendering information includes means for determining the audio rendering information on a per audio frame basis from the bitstream.

The device of the fourth example, wherein the means for determining the audio rendering information means for includes determining the audio rendering information a single time from the bitstream.

In a sixth example, a non-transitory computer-readable storage medium having stored thereon instructions that, when executed, cause one or more processors to determine audio rendering information that includes a signal value identifying an audio renderer used when generating the multi-channel audio content; and render a plurality of speaker feeds based on the audio rendering information specified in the bitstream.

Figures 8A, 8B, 8C, 8D:
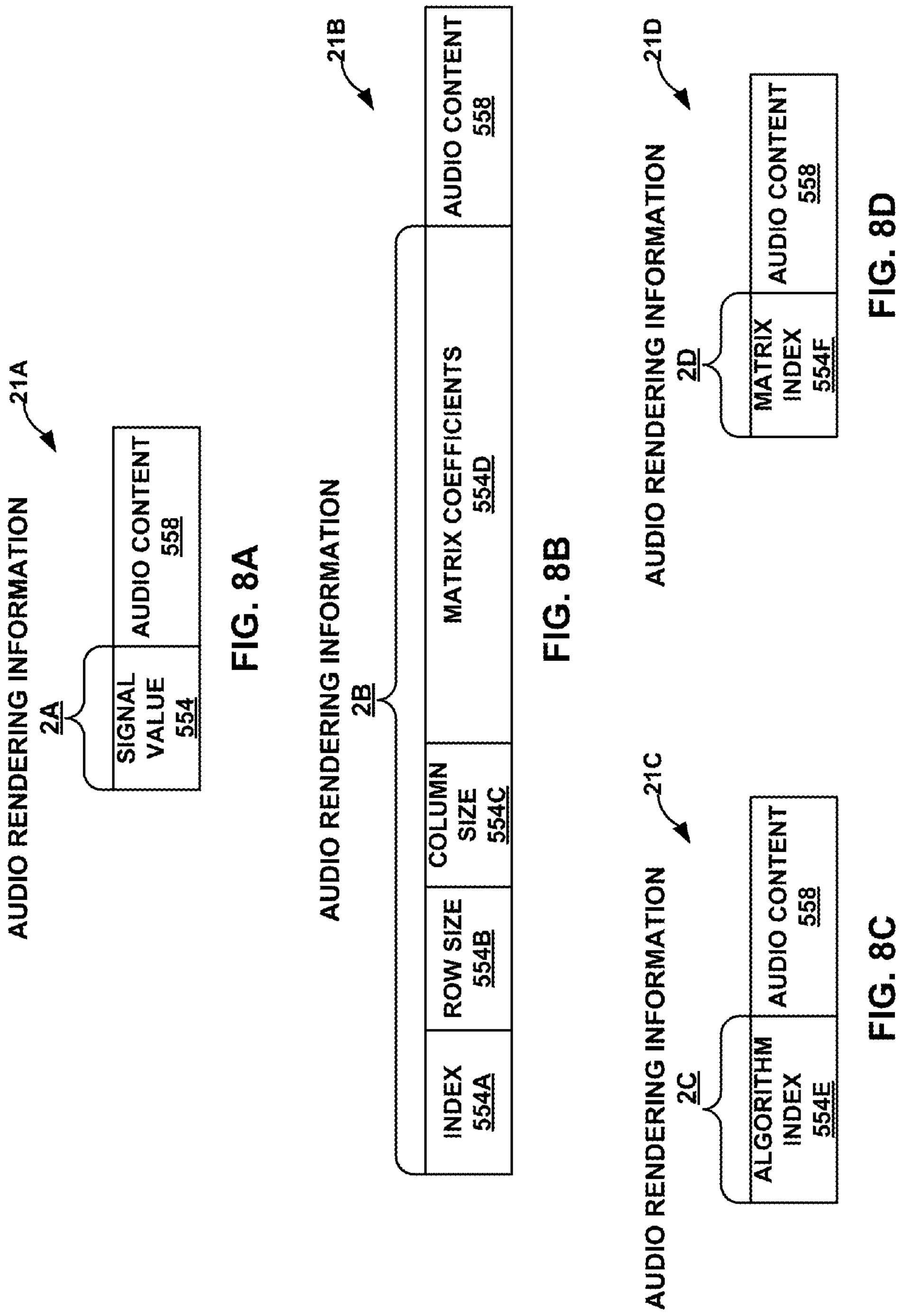
FIGS. 8A-8D are diagram illustrating bitstreams formed in accordance with the techniques described in this disclosure.
Figure 8E:
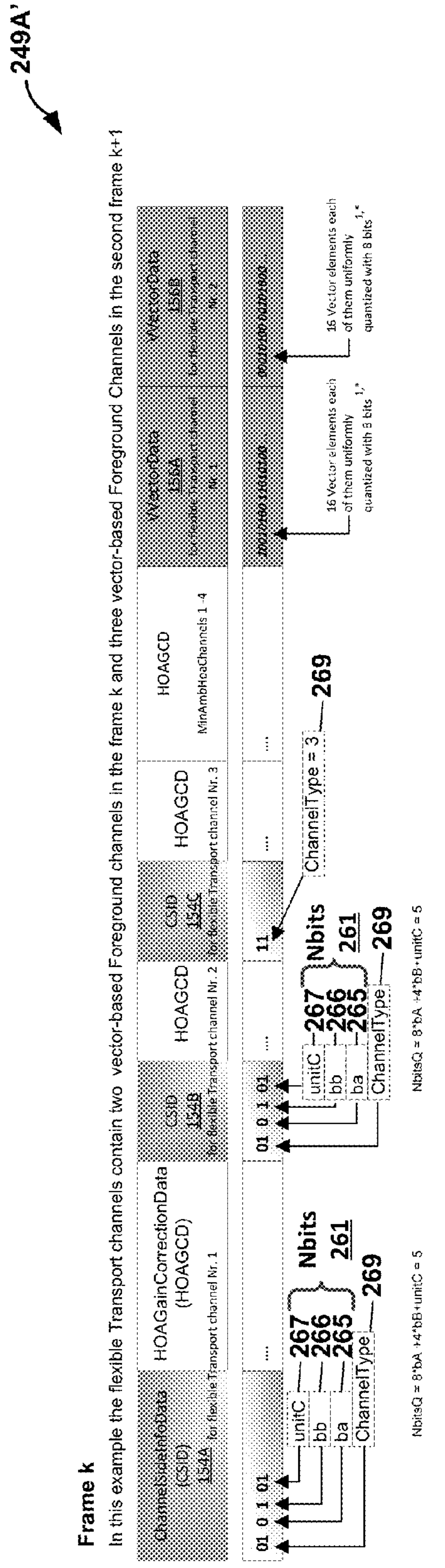
FIGS. 8E-8G are diagrams illustrating portions of the bitstream or side channel information that may specify the compressed spatial components in more detail.
Figure 8F:
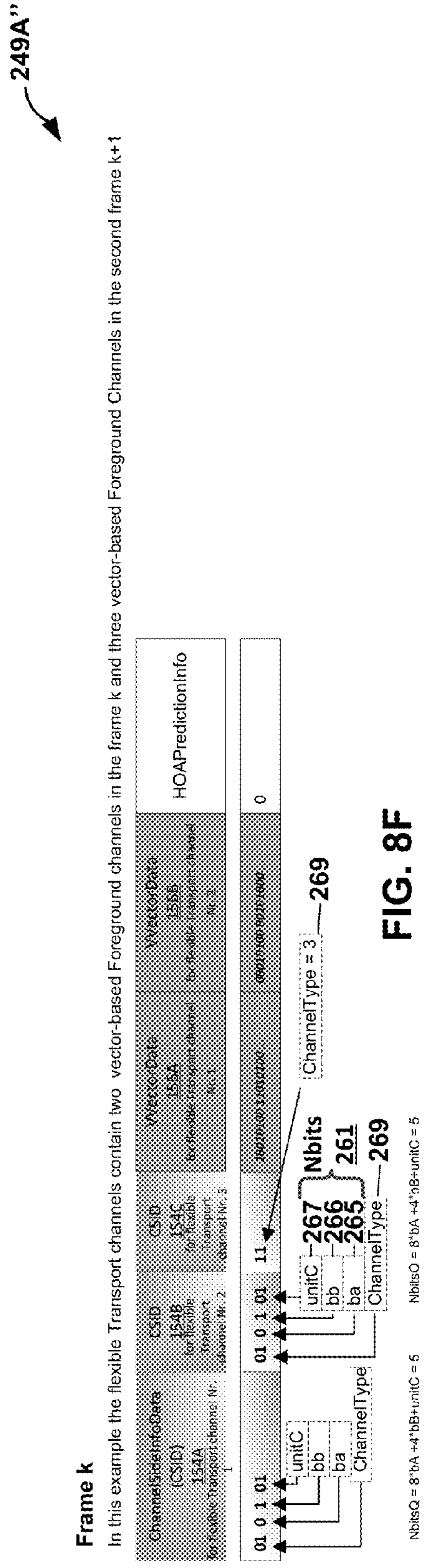

FIGS. 8A-8D are diagram illustrating bitstreams 21A-21D formed in accordance with the techniques described in this disclosure. In the example of FIG. 8A, the bitstream 21A may represent one example of the bitstream 21 shown in FIGS. 2-4 above. The bitstream 21A includes audio rendering information 2A that includes one or more bits defining a signal value 554. This signal value 554 may represent any combination of the below described types of information. The bitstream 21A also includes audio content 558, which may represent one example of the audio content 7/9.

In the example of FIG. 8B, the bitstream 21B may be similar to the bitstream 21A where the signal value 554 of audio rendering information 2B comprises an index 554A, one or more bits defining a row size 554B of the signaled matrix, one or more bits defining a column size 554C of the signaled matrix, and matrix coefficients 554D. The index 554A may be defined using two to five bits, while each of row size 554B and column size 554C may be defined using two to sixteen bits.

The extraction unit 72 may extract the index 554A and determine whether the index signals that the matrix is included in the bitstream 21B (where certain index values, such as 0000 or 1111, may signal that the matrix is explicitly specified in bitstream 21B). In the example of FIG. 8B, the bitstream 21B includes an index 554A signaling that the matrix is explicitly specified in the bitstream 21B. As a result, the extraction unit 72 may extract the row size 554B and the column size 554C. The extraction unit 72 may be configured to compute the number of bits to parse that represent matrix coefficients as a function of the row size 554B, the column size 554C and a signaled (not shown in FIG. 8A) or implicit bit size of each matrix coefficient. Using the determined number of bits, the extraction unit 72 may extract the matrix coefficients 554D, which the audio playback system 16 may use to configure one of the audio renderers 22 as described above. While shown as signaling the audio rendering information 2B a single time in the bitstream 21B, the audio rendering information 2B may be signaled multiple times in bitstream 21B or at least partially or fully in a separate out-of-band channel (as optional data in some instances).

In the example of FIG. 8C, the bitstream 21C may represent one example of bitstream 21 shown in FIGS. 2-4 above. The bitstream 21C includes the audio rendering information 2C that includes a signal value 554, which in this example specifies an algorithm index 554E. The bitstream 21C also includes audio content 558. The algorithm index 554E may be defined using two to five bits, as noted above, where this algorithm index 554E may identify a rendering algorithm to be used when rendering the audio content 558.

The extraction unit 72 may extract the algorithm index 550E and determine whether the algorithm index 554E signals that the matrix are included in the bitstream 21C (where certain index values, such as 0000 or 1111, may signal that the matrix is explicitly specified in bitstream 21C). In the example of FIG. 8C, the bitstream 21C includes the algorithm index 554E signaling that the matrix is not explicitly specified in bitstream 21C. As a result, the extraction unit 72 forwards the algorithm index 554E to the audio playback system 16, which selects the corresponding one (if available) the rendering algorithms (which are denoted as renderers 22 in the example of FIGS. 2-4). While shown as signaling audio rendering information 2C a single time in the bitstream 21C, in the example of FIG. 8C, audio rendering information 2C may be signaled multiple times in the bitstream 21C or at least partially or fully in a separate out-of-band channel (as optional data in some instances).

In the example of FIG. 8D, the bitstream 21D may represent one example of bitstream 21 shown in FIGS. 2-4 above. The bitstream 21D includes the audio rendering information 2D that includes a signal value 554, which in this example specifies a matrix index 554F. The bitstream 21D also includes audio content 558. The matrix index 554F may be defined using two to five bits, as noted above, where this matrix index 554F may identify a rendering algorithm to be used when rendering the audio content 558.

The extraction unit 72 may extract the matrix index 550F and determine whether the matrix index 554F signals that the matrix are included in the bitstream 21D (where certain index values, such as 0000 or 1111, may signal that the matrix is explicitly specified in bitstream 21C). In the example of FIG. 8D, the bitstream 21D includes the matrix index 554F signaling that the matrix is not explicitly specified in bitstream 21D. As a result, the extraction unit 72 forwards the matrix index 554F to audio playback device, which selects the corresponding one (if available) of the renderers 22. While shown as signaling audio rendering information 2D a single time in the bitstream 21D, in the example of FIG. 8D, audio rendering information 2D may be signaled multiple times in the bitstream 21D or at least partially or fully in a separate out-of-band channel (as optional data in some instances).

Figure 8G:
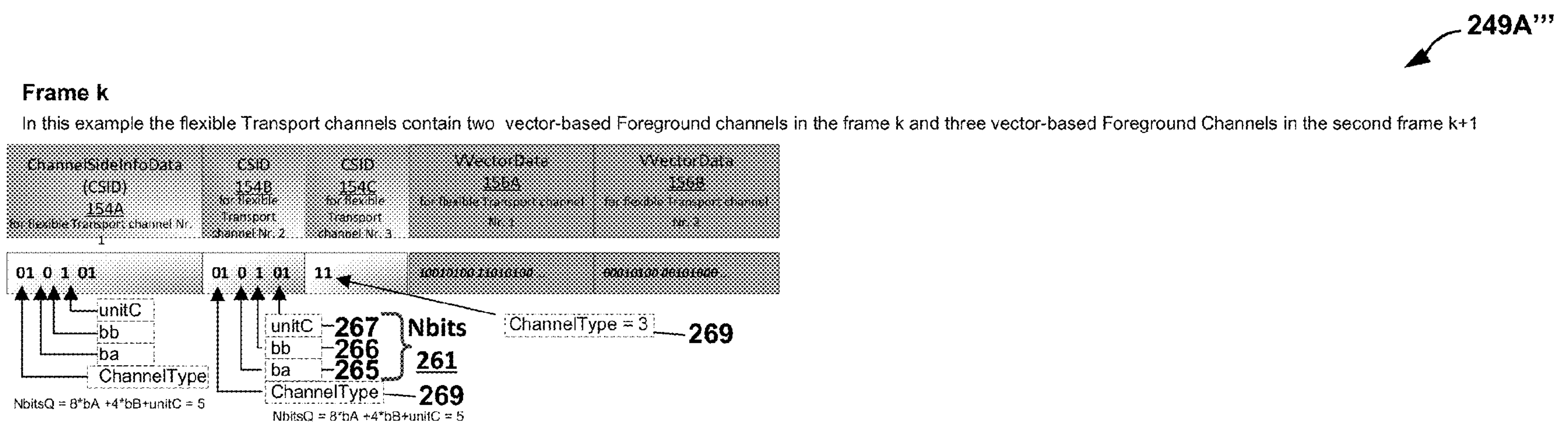

FIGS. 8E-8G are diagrams illustrating portions of the bitstream or side channel information that may specify the compressed spatial components in more detail. FIG. 8E illustrates a first example of a frame 249A' of the bitstream 21. In the example of FIG. 8E, the frame 249A' includes ChannelSideInfoData (CSID) fields 154A-154C, an HOAGainCorrectionData (HOAGCD) fields, and VVectorData fields 156A and 156B. The CSID field 154A includes the unitC 267, bb 266 and ba 265 along with the ChannelType 269, each of which are set to the corresponding values 01, 1, 0 and 01 shown in the example of FIG. 8E. The CSID field 154B includes the unitC 267, bb 266 and ba 265 along with the ChannelType 269, each of which are set to the corresponding values 01, 1, 0 and 01 shown in the example of FIG. 8E. The CSID field 154C includes the ChannelType field 269 having a value of 3. Each of the CSID fields 154A-154C correspond to the respective one of the transport channels 1, 2 and 3. In effect, each CSID field 154A-154C indicates whether the corresponding payload 156A and 156B are direction-based signals (when the corresponding ChannelType is equal to zero), vector-based signals (when the corresponding ChannelType is equal to one), an additional Ambient HOA coefficient (when the corresponding ChannelType is equal to two), or empty (when the ChannelType is equal to three).

In the example of FIG. 8E, the frame 249A includes two vector-based signals (given the ChannelType 269 equal to 1 in the CSID fields 154A and 154B) and an empty (given that the ChannelType 269 is equal to 3 in the CSID field 154C). Based on a forgoing HOAconfig portion (not shown for ease of illustration purposes), the audio decoding device 24 may determine that all 16 V vector elements are encoded. Hence, the VVectorData 156A and 156B each includes all 16 vector elements, each of them uniformly quantized with 8 bits.

As further shown in the example of FIG. 8E, the frame 249A' does not include an HOAPredictionInfo field. The HOAPredictionInfo field may represent a field corresponding to a second directional-based compression scheme that may be removed in accordance with the technique described in this disclosure when the vector-based compression scheme is used to compress HOA audio data.

FIG. 8F is a diagram illustrating a frame 249A" that is substantially similar to the frame 249A except that the HOAGainCorrectionData has been removed from each transport channel stored to the frame 249A". The HOAGainCorrectionData field may be removed from the frame 249A" when gain correction is suppressed in accordance with various aspects of the techniques described above.

FIG. 8G is a diagram illustrating a frame 249A"' which may be similar to the frame 249A" except that the HOAPredictionInfo field is removed. The frame 249A"' represents one example where both aspects of the techniques may be applied in conjunction to remove various fields that may not be necessary in certain circumstances.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed comprises an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into the HOA coefficients for playback by one or more of the playback elements. For instance, a user of the mobile device may record (acquire a soundfield of) a live event (e.g., a meeting, a conference, a play, a concert, etc.), and code the recording into HOA coefficients.

The mobile device may also utilize one or more of the playback elements to playback the HOA coded soundfield. For instance, the mobile device may decode the HOA coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D soundfield and playback the same 3D soundfield at a later time. In some examples, the mobile device may acquire a 3D soundfield, encode the 3D soundfield into HOA, and transmit the encoded 3D soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a soundfield for playback by the delivery systems.

The techniques may also be performed with respect to exemplary audio acquisition devices. For example, the techniques may be performed with respect to an Eigen microphone which may include a plurality of microphones that are collectively configured to record a 3D soundfield. In some examples, the plurality of microphones of Eigen microphone may be located on the surface of a substantially spherical ball with a radius of approximately 4 cm. In some examples, the audio encoding device 20 may be integrated into the Eigen microphone so as to output a bitstream 21 directly from the microphone.

Another exemplary audio acquisition context may include a production truck which may be configured to receive a signal from one or more microphones, such as one or more Eigen microphones. The production truck may also include an audio encoder, such as audio encoder 20 of FIG. 3.

The mobile device may also, in some instances, include a plurality of microphones that are collectively configured to record a 3D soundfield. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder, such as audio encoder 20 of FIG. 3.

A ruggedized video capture device may further be configured to record a 3D soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a 3D soundfield that represents the action all around the user (e.g., water crashing behind the user, another rafter speaking in front of the user, etc. . . . ).

The techniques may also be performed with respect to an accessory enhanced mobile device, which may be configured to record a 3D soundfield. In some examples, the mobile device may be similar to the mobile devices discussed above, with the addition of one or more accessories. For instance, an Eigen microphone may be attached to the above noted mobile device to form an accessory enhanced mobile device. In this way, the accessory enhanced mobile device may capture a higher quality version of the 3D soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D soundfield. Moreover, in some examples, headphone playback devices may be coupled to a decoder 24 via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D soundfield of the sports game may be acquired (e.g., one or more Eigen microphones may be placed in and/or around the baseball stadium), HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the audio encoding device 20 may perform a method or otherwise comprise means to perform each step of the method for which the audio encoding device 20 is configured to perform In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the audio decoding device 24 may perform a method or otherwise comprise means to perform each step of the method for which the audio decoding device 24 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding device 24 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

The invention claimed is:

1. A device configured to reconstruct a matrix to render a plurality of speaker feeds, the device comprising:
- one or more processors configured to:
  - obtain, from a bitstream that includes an encoded version of higher order ambisonic coefficients, sparseness information indicative of a sparseness of the matrix used to render the plurality of speaker feeds, and value symmetry information that indicates value symmetry of the matrix;
  - obtain, from the bitstream, an indication of a number of bits used to represent the matrix;
  - based on the sparseness information, the value symmetry information, and the indication of the number of bits, reconstruct the matrix; and
  - output the reconstructed matrix and the plurality of speaker feeds; and
- a memory coupled to the one or more processors, and configured to store the sparseness information.

2. The device of claim 1, wherein the one or more processors are further configured to determine a speaker layout for which the matrix is to be used to render the plurality of speaker feeds from the higher order ambisonic coefficients.

3. The device of claim 1, further comprising a speaker configured to reproduce a soundfield represented by the higher order ambisonic coefficients based on the plurality of speaker feeds.

4. The device of claim 1, wherein the one or more processors are further configured to obtain audio rendering information indicative of a signal value identifying an audio renderer used when generating the multi-channel audio content, and render the plurality of speaker feeds based on the audio rendering information.

5. The device of claim 4,
- wherein the signal value includes the matrix used to render the higher order ambisonic coefficients to the multi-channel audio data, and
- wherein the one or more processors are configured to render the plurality of speaker feeds based on the matrix included in the signal value.

6. The device of claim 1, further comprising one or more loudspeakers coupled to the one or more processors, and configured to reproduce a soundfield based on the plurality of speaker feeds.

7. A method of reconstructing a matrix to render a plurality of speaker feeds, the method comprising:
- obtaining, by an audio decoding device and from a bitstream that includes an encoded version of the higher order ambisonic coefficients, sparseness information indicative of a sparseness of the matrix used to render the plurality of speaker feeds, and value symmetry information that indicates value symmetry of the matrix;
- obtaining from the bitstream, by the audio decoding device, and based on the value symmetry information and the sparseness information, an indication of a number of bits used to represent the matrix;
- based on the value symmetry information, the sparseness information, and the indication of the number of bits, reconstructing, by the audio decoding device, the matrix; and
- outputting, by the audio decoding device, the reconstructed matrix and the plurality of speaker feeds.

8. The method of claim 7, further comprising determining a speaker layout for which the matrix is to be used to render the plurality of speaker feeds from the higher order ambisonic coefficients.

9. The method of claim 7, further comprising reproducing a soundfield represented by the higher order ambisonic coefficients based on the plurality of speaker feeds.

10. The method of claim 7, further comprising obtaining audio rendering information indicative of a signal value identifying an audio renderer used when generating the plurality of speaker feeds; and rendering the plurality of speaker feeds based on the audio rendering information.

11. The method of claim 10, wherein the signal value includes the matrix used to render the higher order ambisonic coefficients to the plurality of speaker feeds, and wherein the method further comprises rendering the plurality of speaker feeds based on the matrix included in the signal value.

12. The method of claim 7, further comprising reproducing, by one or more loudspeakers coupled to the audio decoding device, a soundfield based on the plurality of speaker feeds.

13. A device configured to produce a bitstream, the device comprising:

a memory configured to store a matrix used to render a plurality of speaker feeds; and one or more processors coupled to the memory, and configured to:

obtain sparseness information indicative of a sparseness of the matrix used to render the plurality of speaker feeds;

obtain value symmetry information that indicates value symmetry of the matrix;

compress the matrix based on the value symmetry information, and the value symmetry information;

obtain an indication of a number of bits used to represent the compressed matrix;

specify, in the bitstream, the sparseness information, the value symmetry information, the indication of a number of bits, and an encoded version of higher order ambisonic coefficients.

14. The device of claim 13, wherein the one or more processors are further configured to determine a speaker layout for which the matrix is to be used to render the plurality of speaker feeds from the higher order ambisonic coefficients.

15. The device of claim 13, further comprising a microphone configured to capture a soundfield represented by the higher order ambisonic coefficients.

16. The device of claim 13, wherein the one or more processors are further configured to determine sign symmetry information that indicates sign symmetry of the matrix; and wherein the one or more processors are configured to, based on the sign symmetry information, the value symmetry information, and the sparseness information, compress the matrix.

17. A method of producing a bitstream, the method comprising:

obtaining, by an audio encoding device, sparseness information indicative of a sparseness of a matrix used to render a plurality of speaker feeds;

obtaining, by the audio encoding device, value symmetry information that indicates value symmetry of the matrix;

compressing, by the audio encoding device, the matrix based on the value symmetry information, and the value symmetry information;

obtaining, by the audio encoding device, an indication of a number of bits used to represent the compressed matrix;

specify, by the audio encoding device and in the bitstream, the sparseness information, the value symmetry information, the indication of a number of bits, and an encoded version of higher order ambisonic coefficients.

18. The method of claim 17, further comprising determining sign symmetry information that indicates sign symmetry of the matrix, and wherein compressing the matrix comprises compressing, based on the sign symmetry information, the value symmetry information, and the sparseness information, the matrix.

19. The method of claim 17, further comprising determining a speaker layout for which the matrix is to be used to render the plurality of speaker feeds from the higher order ambisonic coefficients.

20. The method of claim 17, further comprising capturing a soundfield represented by the higher order ambisonic coefficients.

* * * * *